(12) United States Patent
Kim

(10) Patent No.: US 12,301,972 B2
(45) Date of Patent: May 13, 2025

(54) CAMERA MODULE AND OPTICAL DEVICE

(71) Applicant: LG INNOTEK CO., LTD., Seoul (KR)

(72) Inventor: Kyung Won Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 251 days.

(21) Appl. No.: 17/924,152

(22) PCT Filed: May 18, 2021

(86) PCT No.: PCT/KR2021/006225
§ 371 (c)(1),
(2) Date: Nov. 9, 2022

(87) PCT Pub. No.: WO2021/235835
PCT Pub. Date: Nov. 25, 2021

(65) Prior Publication Data
US 2023/0188821 A1   Jun. 15, 2023

(30) Foreign Application Priority Data
May 19, 2020   (KR) .................. 10-2020-0059897

(51) Int. Cl.
*H04N 23/57* (2023.01)
*H04N 23/51* (2023.01)
*H04N 23/54* (2023.01)
*H04N 23/55* (2023.01)

(52) U.S. Cl.
CPC ............ *H04N 23/57* (2023.01); *H04N 23/51* (2023.01); *H04N 23/54* (2023.01); *H04N 23/55* (2023.01)

(58) Field of Classification Search
CPC ........ H04N 23/57; H04N 23/51; H04N 23/54; H04N 23/55; G03B 3/10; G03B 5/00; G03B 30/00; G03B 2205/0061; G03B 17/12
See application file for complete search history.

(56) References Cited

U.S. PATENT DOCUMENTS

| 8,027,106 B2 * | 9/2011 | Kim .................. G02B 7/102 |
| | | 359/554 |
| 8,345,363 B2 * | 1/2013 | Aoki .................. H02N 2/025 |
| | | 359/824 |

(Continued)

FOREIGN PATENT DOCUMENTS

| CN | 101047349 A | 10/2007 |
| CN | 107092068 A | 8/2017 |

(Continued)

*Primary Examiner* — Nhan T Tran
(74) *Attorney, Agent, or Firm* — Birch, Stewart, Kolasch & Birch, LLP

(57) ABSTRACT

An embodiment of the present invention relates to a camera module comprising: a housing; a lens barrel disposed in the housing; first and second elastic members coupled to the lens barrel; and a piezo motor including a column disposed between the first and second elastic members, wherein: the first and second elastic members press the column of the piezo motor; the lens barrel comprises a body part and a coupling part connected to the body part; and the coupling part comprises a groove coupled to one side of the second elastic member and a protrusion coupled to the other side of the second elastic member.

20 Claims, 19 Drawing Sheets

(56) References Cited

U.S. PATENT DOCUMENTS

| | | | | |
|---|---|---|---|---|
| 2007/0228884 A1* | 10/2007 | Manabe | ............... | H02N 2/025 |
| | | | | 310/328 |
| 2007/0229702 A1* | 10/2007 | Shirono | ............. | G02B 13/009 |
| | | | | 348/374 |
| 2009/0279186 A1 | 11/2009 | Wang et al. | | |
| 2011/0141584 A1* | 6/2011 | Henderson | ............ | G02B 7/022 |
| | | | | 359/896 |

FOREIGN PATENT DOCUMENTS

| | | |
|---|---|---|
| JP | 2006-98577 A | 4/2006 |
| JP | 2009-86433 A | 4/2009 |
| JP | 2009-222878 A | 10/2009 |
| JP | 2010-39063 A | 2/2010 |
| KR | 10-2009-0113951 A | 11/2009 |
| KR | 10-2010-0124941 A | 11/2010 |
| KR | 10-2012-0042386 A | 5/2012 |
| KR | 10-2020-0011533 A | 2/2020 |

\* cited by examiner

CAMERA MODULE AND OPTICAL DEVICE

CROSS REFERENCE TO RELATED APPLICATIONS

This application is the National Phase of PCT/KR2021/006225 filed on May 18, 2021, which claims priority under 35 U.S.C. § 119 (a) to Patent Application No. 10-2020-0059897 filed in the Republic of Korea on May 19, 2020, all of which are hereby expressly incorporated by reference into the present application.

TECHNICAL FIELD

The present embodiment relates to a camera module and an optical device.

BACKGROUND ART

A portable device such as a tablet PC or a smartphone is provided with a camera module for acquiring image information from a subject. The camera module of such a portable device is increasingly required to have a high pixel and high performance, and recently, as an auto focus (AF) function and a focal length are changed, a product capable of optical zoom is being released.

In general, a camera module provided in a portable device moves a lens in an optical axis direction to adjust autofocus and/or optical zoom. In order to move the lens, a voice coil motor (VCM) type actuator that moves the lens by electromagnetic force by disposing a coil and a magnet on the camera module is widely used, and a Hall sensor is used to detect the position and movement of the lens.

However, the conventional VCM actuator has a problem in that it is difficult to implement a long stroke for high magnification zoom due to a weak driving force, so the use of a piezo motor is increasing in recent years.

However, since the piezo motor has the characteristic of driving the lens by means of a carbon rod with vibration generated from the piezoelectric element, there is a problem in that the piezo motor must be fixed by pressing it with strong pressure.

DETAILED DESCRIPTION OF THE INVENTION

Technical Subject

The present embodiment is intended to provide a lens driving device comprising an elastic member for pressing and fixing the lens driving device using a piezo motor with strong pressure.

In addition, it is intended to provide a lens driving device in which an elastic member can keep the pressure being applied to the piezo motor constant.

In addition, it is intended to provide a lens driving device in which the structure of an elastic member is simplified for miniaturization and improvement of the assembly structure.

Technical Solution

A camera module according to the present embodiment comprises: a housing; a lens barrel being disposed inside the housing; a first elastic member and a second elastic member being coupled to the lens barrel; and a piezo motor comprising a column being disposed between the first elastic member and the second elastic member, wherein the first elastic member and second elastic member press the column of the piezo motor, wherein the lens barrel comprises a body unit and a coupling unit being connected to the body unit, and wherein the coupling unit comprises a groove being coupled to one side of the second elastic member and a protrusion being coupled to the other side of the second elastic member.

In addition, the coupling unit of the lens barrel may comprise a first groove into which one side of the first elastic member is inserted, and a second groove into which the other side of the first elastic member is inserted.

In addition, the first elastic member may comprise a first portion having a first length in an optical axis direction, and a second portion and a third portion being extended from the first portion and having a second length smaller than the first length in the optical axis direction.

In addition, the first portion of the first elastic member comprises: a first inclined surface being disposed between the first portion of the first elastic member and the second portion of the first elastic member; and a second inclined surface being disposed between the first portion of the first elastic member and the third portion of the first elastic member, wherein an inclined direction of the first inclined surface of the first elastic member may be different from an inclined direction of the second inclined surface of the first elastic member.

In addition, the first elastic member comprises an extension part being bent at a first angle from the first portion, wherein the extension part of the first elastic member may not come into contact with the column of the piezo motor.

In addition, the second elastic member comprises: a first region being disposed on one side of the coupling unit of the lens barrel; a second region being disposed on the other side of the coupling unit of the lens barrel; and a third region connecting the first region and the second region, wherein the third region of the second elastic member is formed to be flat and may be in contact with the column of the piezo motor at least in part.

In addition, the second region of the second elastic member may comprise a bent portion being bent toward the third region of the second elastic member.

In addition, the other side surface of the coupling unit of the lens barrel comprises a groove, wherein the bent portion of the second region of the second elastic member may be disposed to be caught by the groove of the coupling unit of the lens barrel.

In addition, the bent portion of the second elastic member is formed in a hook shape, and the bent portion of the second elastic member and the lens barrel may be hook-coupled.

In addition, the first elastic member comprises: a first portion having a first length in an optical axis direction; a second portion being extended from the first portion and having a second length smaller than the first length in the optical axis direction; and a third portion, wherein the second region of the second elastic member comprises two second regions spaced apart from each other in an optical axis direction, and wherein the second portion of the first elastic member may be disposed in a space between the two second regions of the second elastic member.

In addition, the second portion and the third portion of the first elastic member may be parallel to the third region of the second elastic member.

In addition, the coupling unit of the lens barrel comprises: a first outer side surface; a second outer side surface being disposed at an opposite side of the first outer side surface; and a third outer side surface connecting the first outer side surface and the second outer side surface, wherein the first elastic member is disposed on the second outer side surface of the coupling unit of the lens barrel, and wherein the second elastic member may be spaced apart from the first elastic member.

In addition, the coupling unit of the lens barrel comprises: a first outer side surface; a second outer side surface being disposed at an opposite side of the first outer side surface; and a third outer side surface connecting the first outer side surface and the second outer side surface, wherein the coupling unit of the lens barrel comprises a groove formed in the second outer side surface, and wherein at least a portion of the second elastic member may be inserted into the groove of the second outer side surface of the coupling unit.

In addition, the coupling unit comprises a protrusion being protruded from the first outer side surface of the coupling unit, the second elastic member comprises a hole being formed at a position corresponding to the protrusion of the coupling unit, and the protrusion of the coupling unit may penetrate the hole of the second elastic member.

In addition, a groove formed in a 'V' shape of the coupling unit is comprised, and the first portion of the first elastic member may be formed in a shape corresponding to the groove of the coupling unit of the lens barrel.

In addition, the lens barrel comprises a protruded part being protruded from an outer circumferential surface of the body unit of the lens barrel and disposed at an opposite side of the coupling unit, and a pin for guiding the movement of the lens barrel in an optical axis direction may be disposed in the protruded part.

In addition, the housing comprises an upper plate unit and a side plate unit being extended from the upper plate unit; the lens barrel comprises a first lens barrel being disposed below the upper plate unit of the housing, a second lens barrel being disposed below the first lens barrel; the lens barrel comprises a first lens being coupled to the upper plate unit of the housing, a second lens being coupled to the first lens barrel, and a third lens being coupled to the second lens barrel; and the second lens and the third lens may be individually movable.

In addition, the second lens and the third lens may move in an optical axis direction, and a moving distance of the second lens may be different from a moving distance of the third lens.

The optical device according to the present embodiment comprises a main body; a camera module of claim 1 being disposed on the main body; and a display being disposed in the main body and outputting an image being photographed by the camera module.

The camera module according to the present embodiment comprises: a housing; a lens barrel disposed in the housing; a first elastic member and a second elastic member being coupled to the lens barrel; and a piezo motor comprising a column being disposed between the first elastic member and the second elastic member, wherein the first elastic member and the second elastic member press the column of the piezo motor, wherein the lens barrel comprises a body unit and a coupling unit being connected to the body unit, wherein the second elastic member is coupled to a groove of the coupling unit through the hook shape at one side thereof, and may be coupled with the protrusion of the coupling unit through the opening shape at the other side thereof.

In addition, a surface connecting the one side of and the other side of the second elastic member may comprise a flat surface or a curved surface being bent at least in part.

Advantageous Effects

Through the present embodiment, a lens driving device comprising an elastic member for pressing and fixing the lens driving device using a piezo motor with a strong pressure may be provided.

In addition, the elastic member may keep the pressure being applied to the piezo motor constant.

In addition, the structure of the elastic member can be simplified so that miniaturization and assemblability can be enhanced.

BEST MODE

Figure 1:
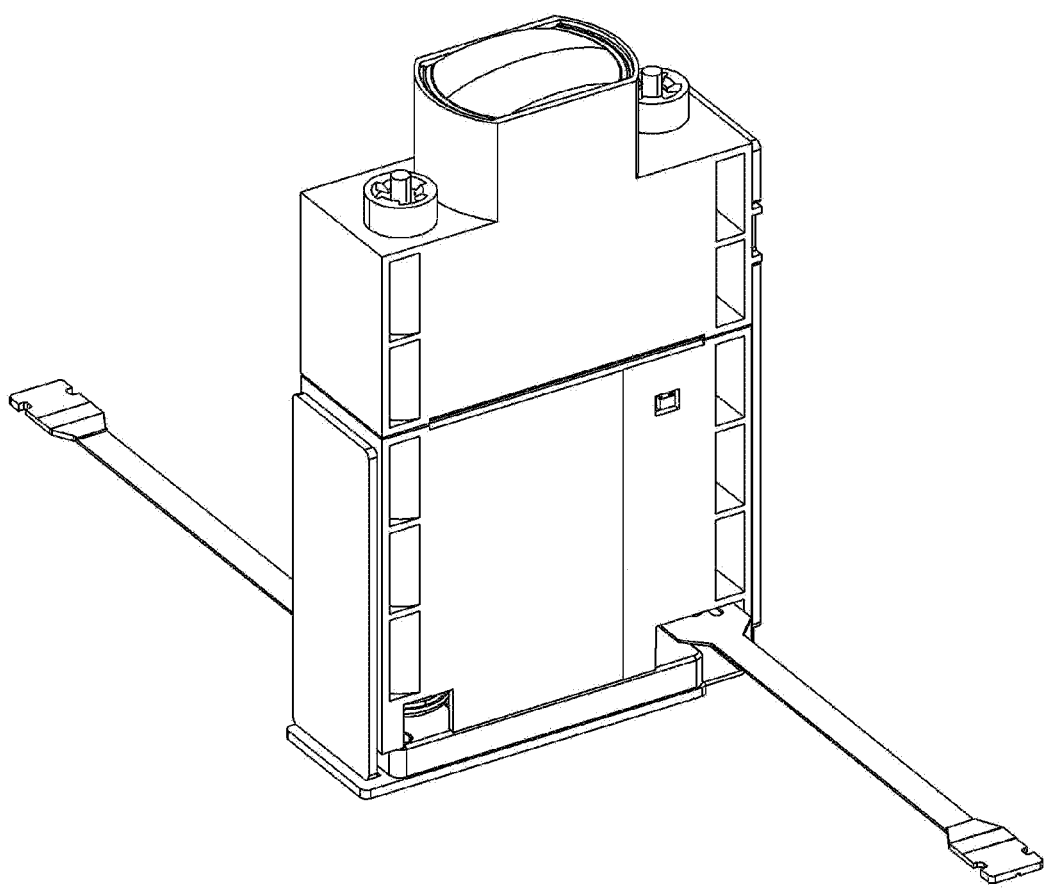
FIG. 1 is a perspective view of a camera module according to the present embodiment.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

An 'optical axis direction' used hereinafter is defined as an optical axis direction of a lens and/or an image sensor being coupled to a lens driving device.

The 'vertical direction' used hereinafter may be a direction parallel to the optical axis direction. The vertical direction may correspond to the 'z-axis direction'. The 'horizontal direction' used hereinafter may be a direction perpendicular to the vertical direction. That is, the horizontal direction may be a direction perpendicular to the optical axis. Accordingly, the horizontal direction may comprise an 'x-axis direction' and a 'y-axis direction'.

The 'auto focus (AF) function' used hereinafter is defined as a function to automatically focus on a subject by adjusting the distance from the image sensor by moving the lens in an optical axis direction according to the distance of the subject so that the image sensor can obtain a clear image of the subject. In addition, 'closed-loop auto focus (CLAF) control' is defined as real time feedback control of the lens position by sensing the distance between the image sensor and the lens to enhance focus adjustment accuracy.

The 'optical image stabilization (OIS) function' used hereinafter is defined as the function of moving or tilting the lens in a direction perpendicular to the optical axis to cancel the vibration (movement) generated in the image sensor by external force.

Hereinafter, the configuration of the camera module according to the present embodiment will be described with reference to the drawings.

Figure 2:
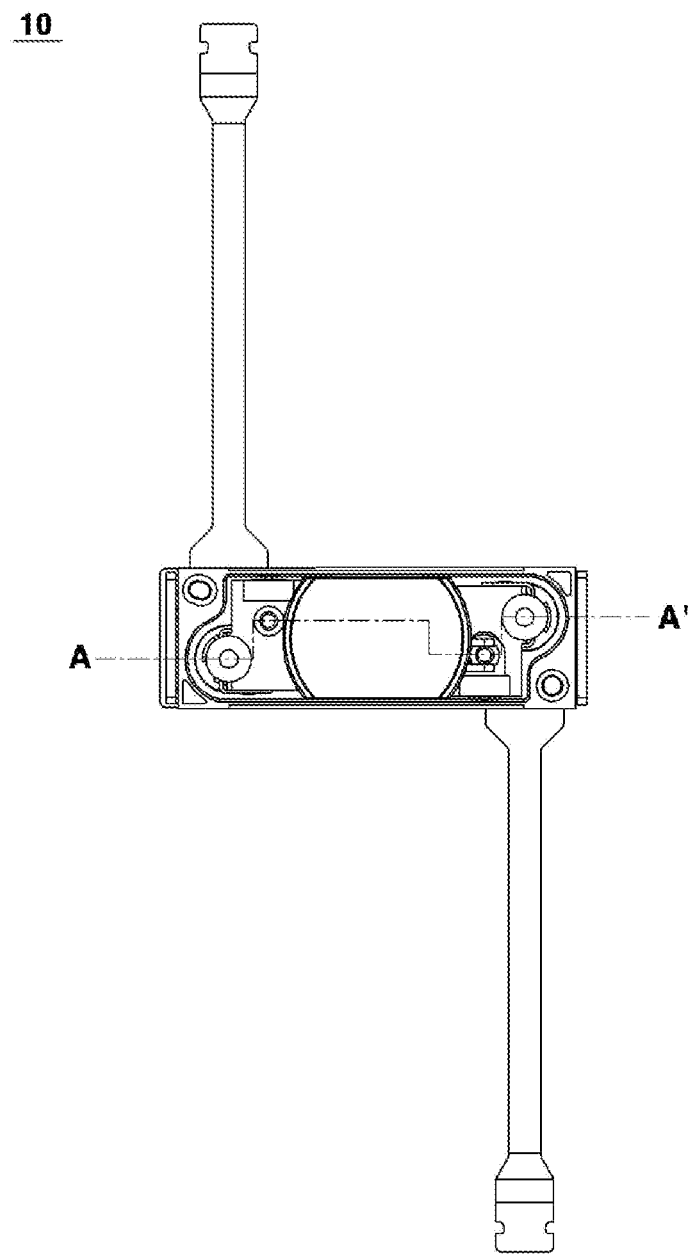
FIG. 2 is a front view with an upper plate unit removed from the camera module according to the present embodiment.
Figure 3:
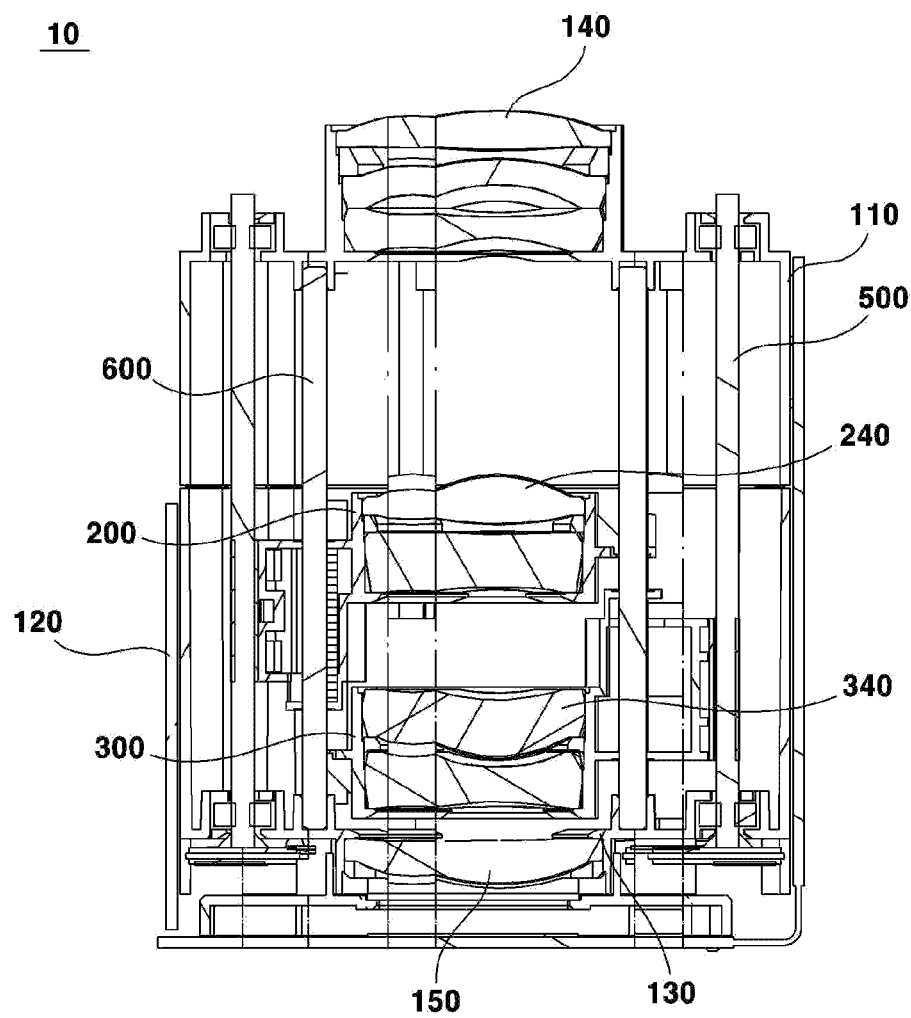
FIG. 3 is a cross-sectional view taken along line A-A' of FIG. 2
Figure 4:
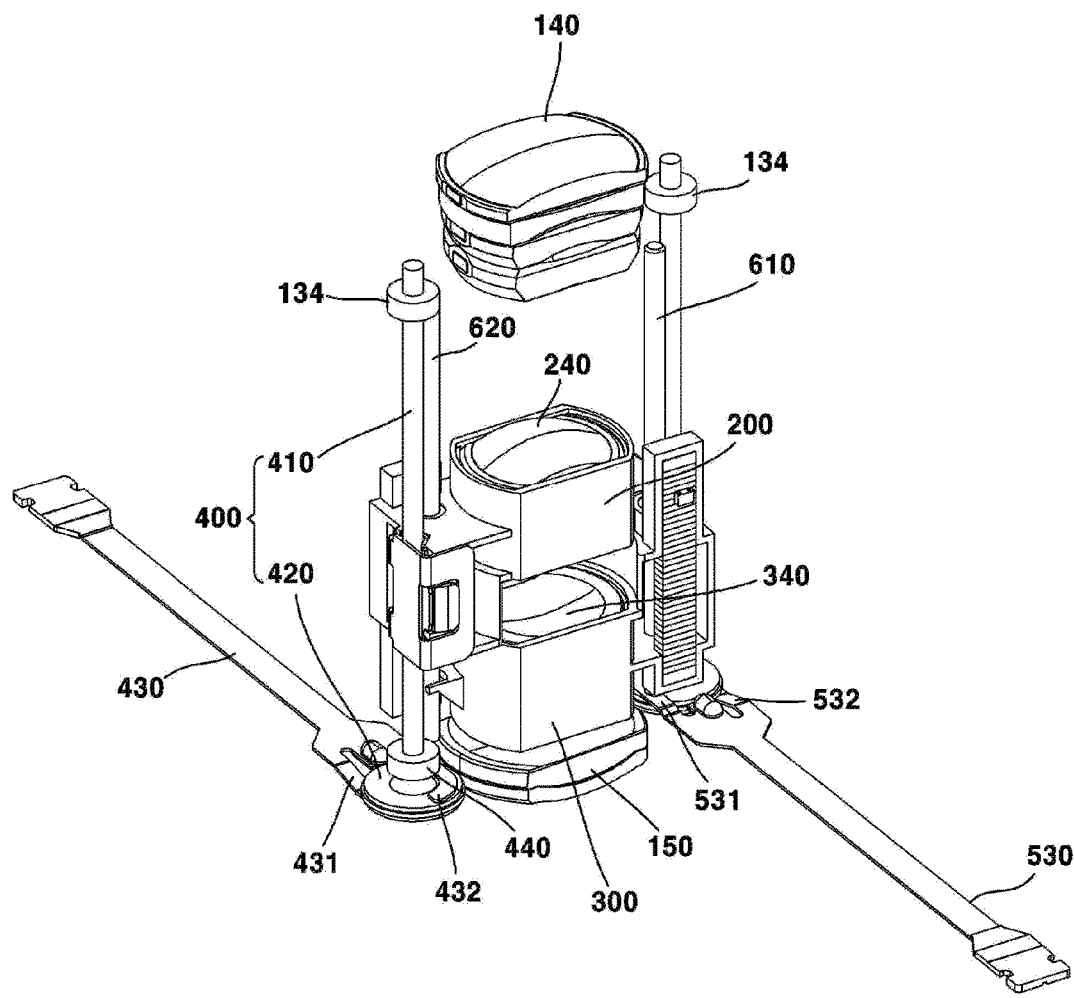
FIG. 4 is a perspective view with the side plate unit removed from the camera module according to the present embodiment.
Figure 5:
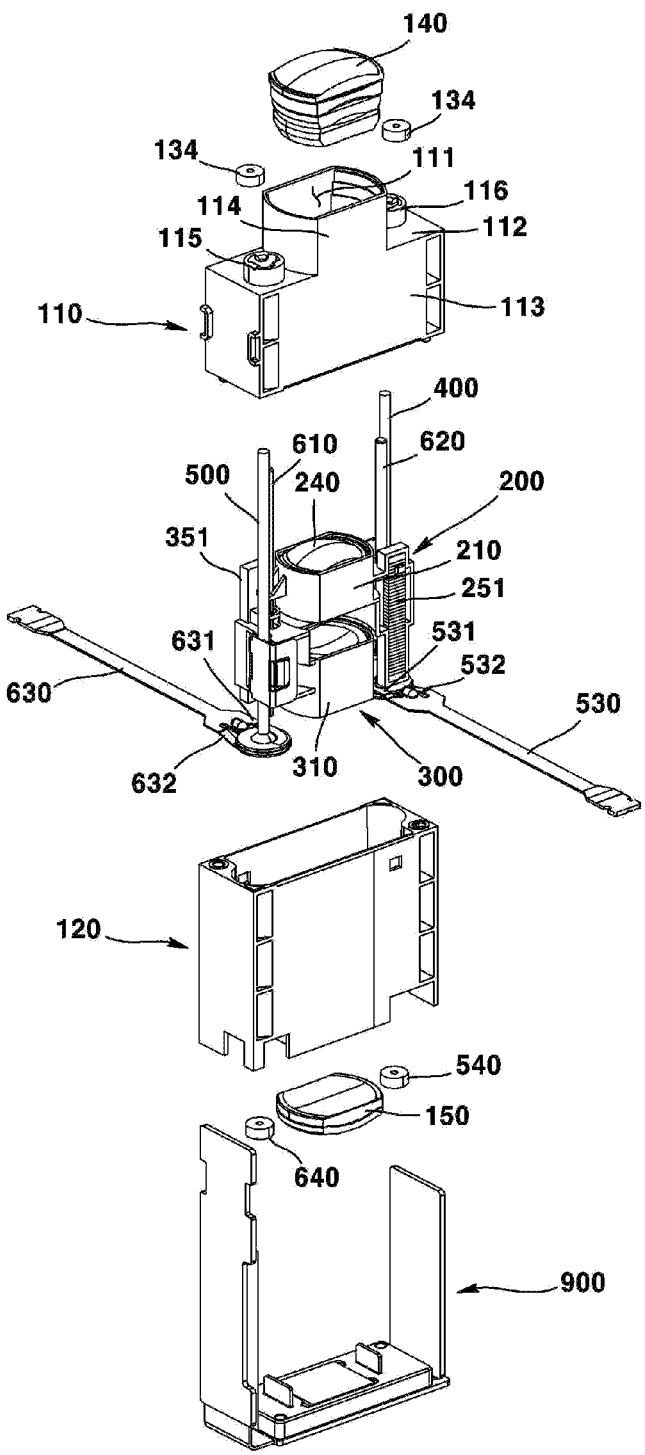
FIG. 5 is an exploded perspective view of a camera module according to the present embodiment.
Figure 6:
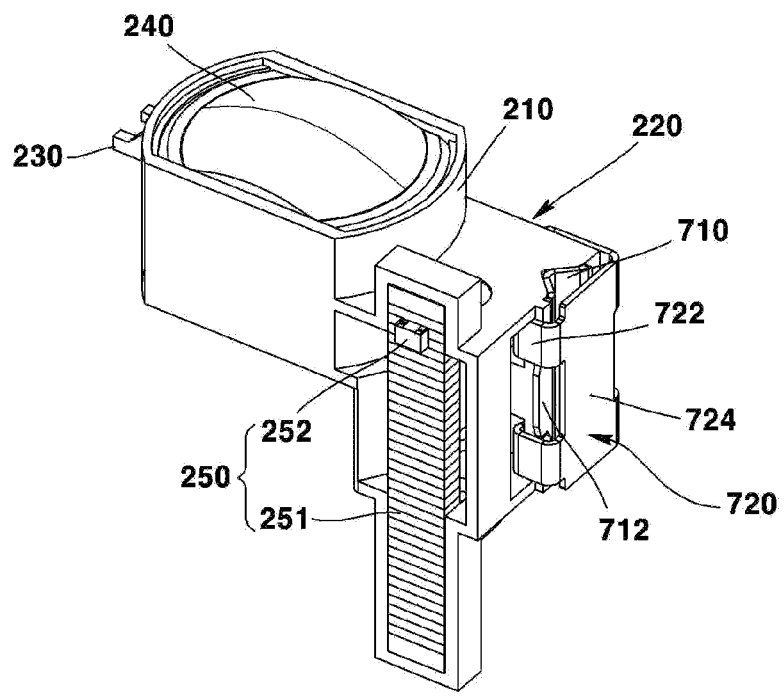
FIG. 6 is a perspective view of a first lens barrel of a camera module according to the present embodiment.
Figure 7:
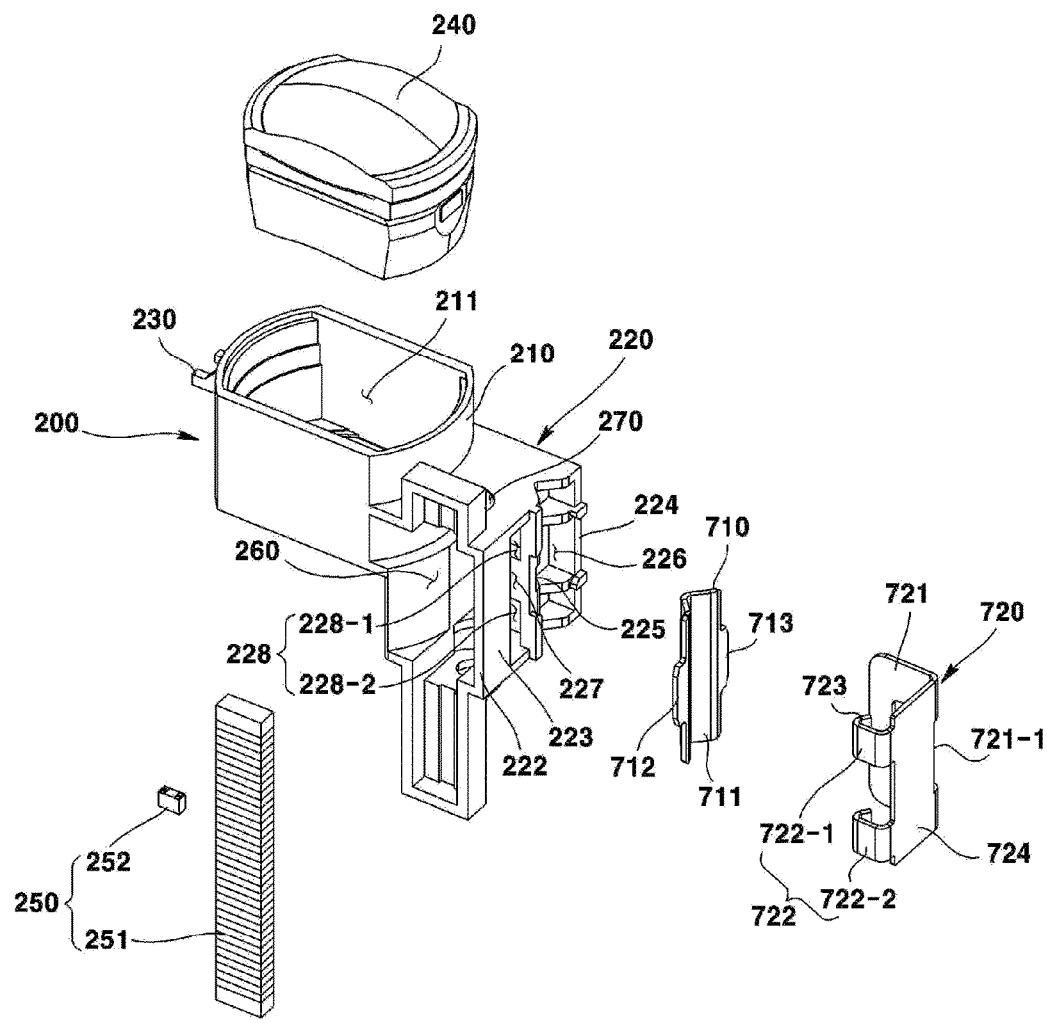
FIG. 7 is an exploded perspective view of FIG. 6
Figure 8:
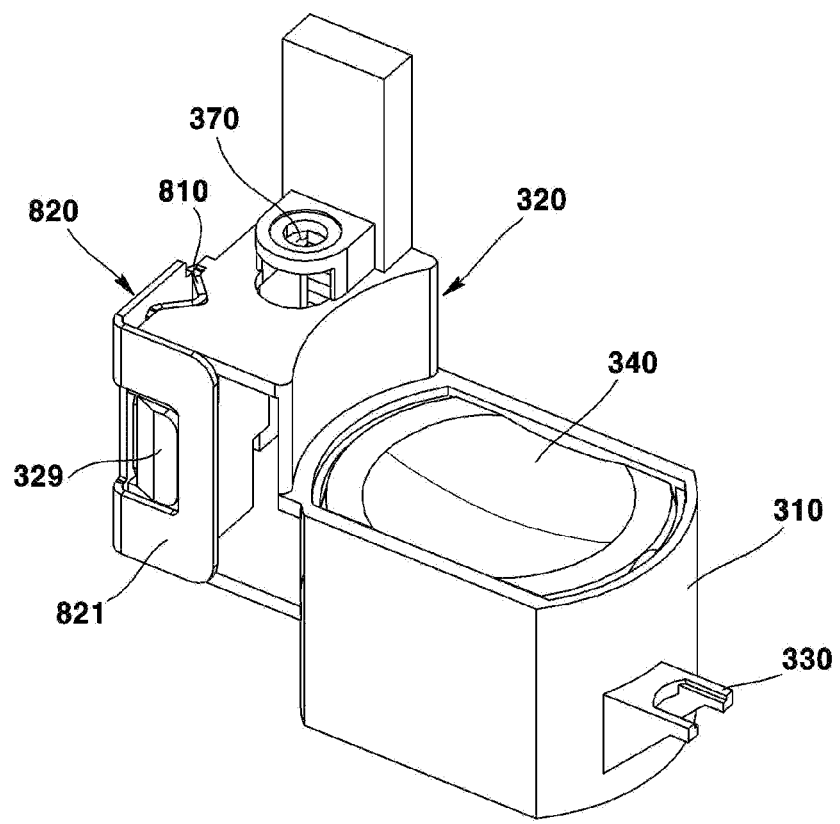
FIG. 8 is a side view of a second lens barrel of the camera module according to the present embodiment.
Figure 9:
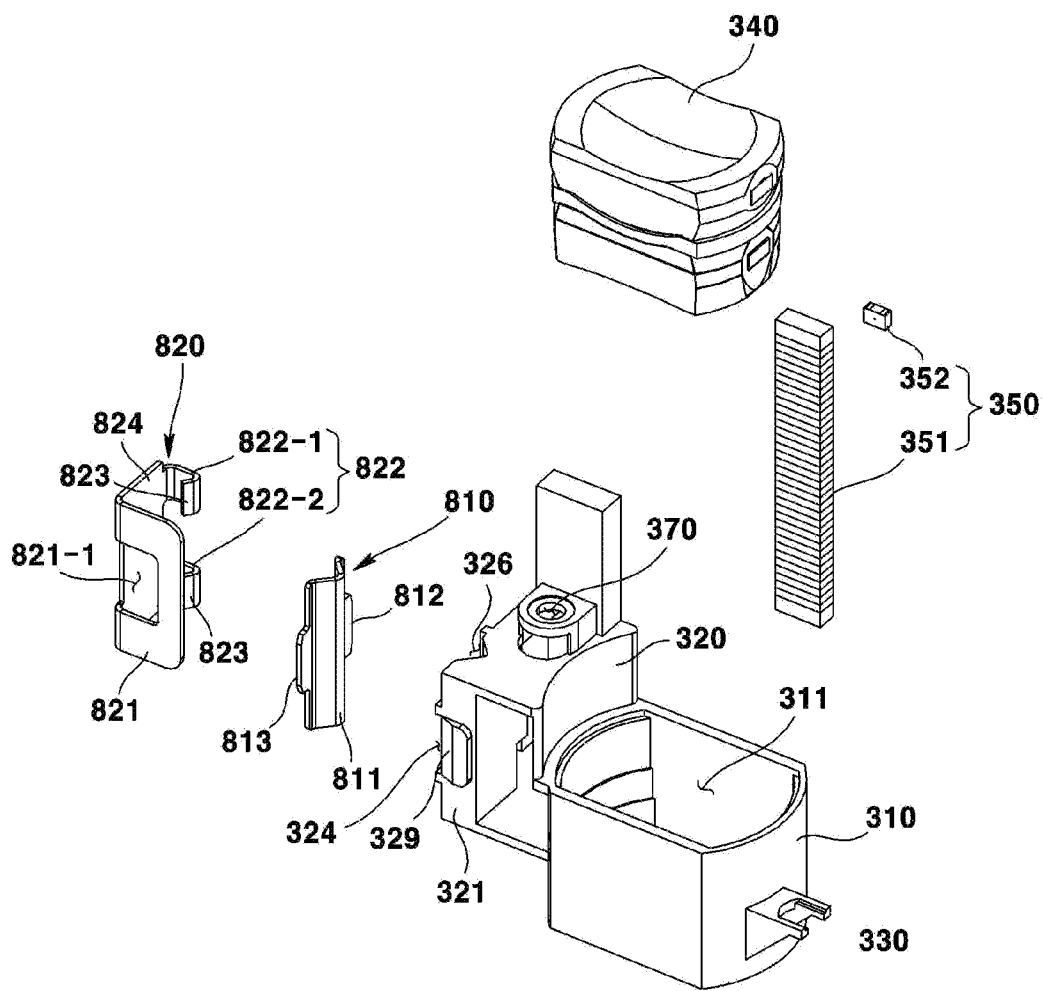
FIG. 9 is an exploded perspective view of FIG. 8
Figure 10:
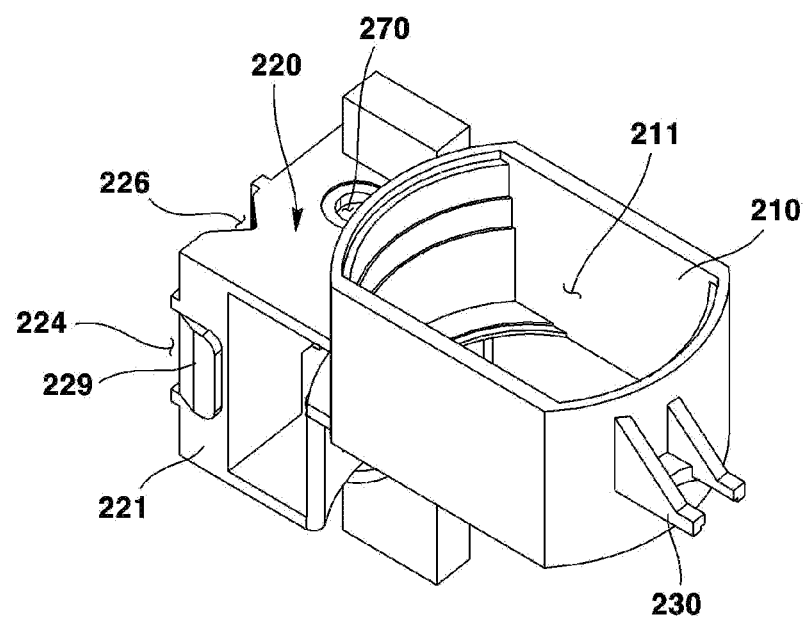
FIG. 10 is a perspective view illustrating the first lens barrel of the camera module according to the present embodiment from another angle.
Figure 11:
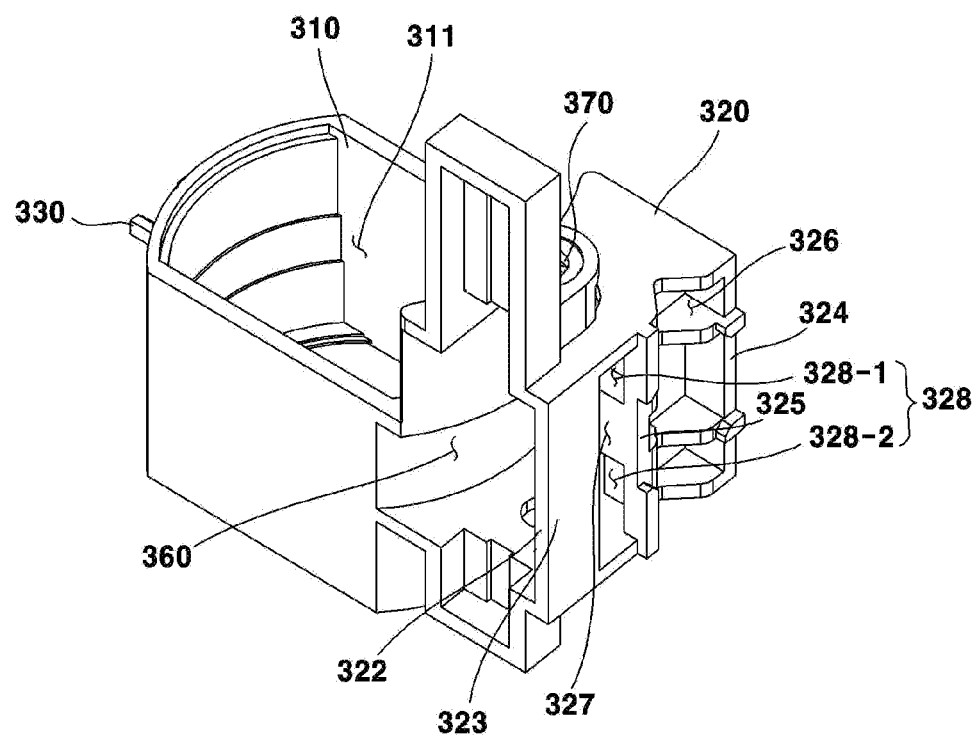
FIG. 11 is a perspective view illustrating a second lens barrel of the camera module according to the present embodiment from another angle.
Figure 12:
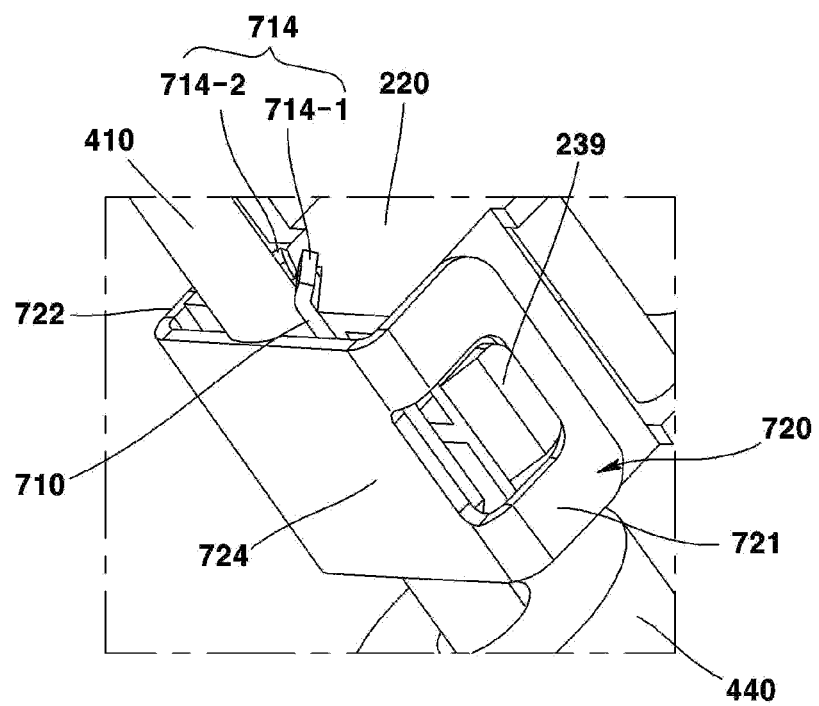
FIGS. 12 to 14 are views related to the first piezo motor, the first elastic member, and the second elastic member of the camera module according to the present embodiment.
Figure 13:
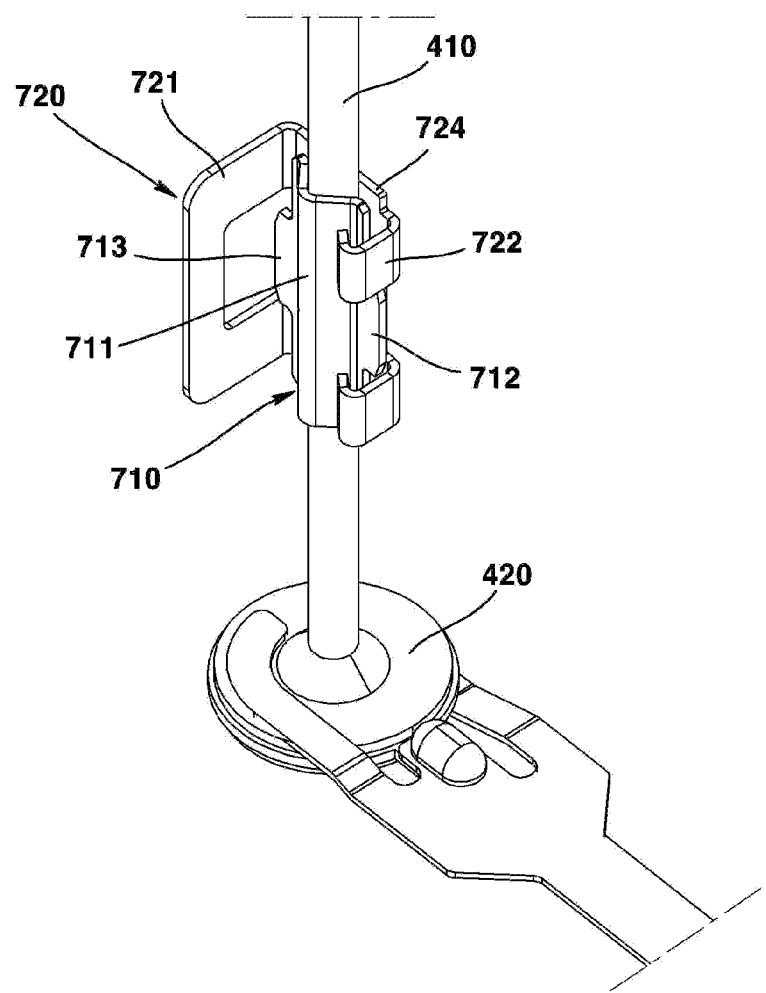
Figure 14:
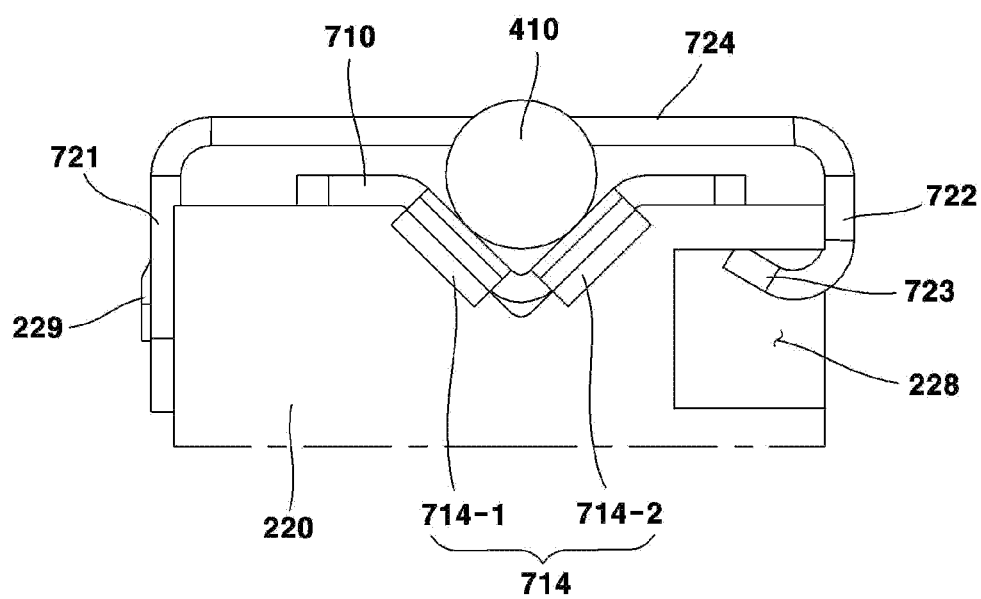
Figure 15:
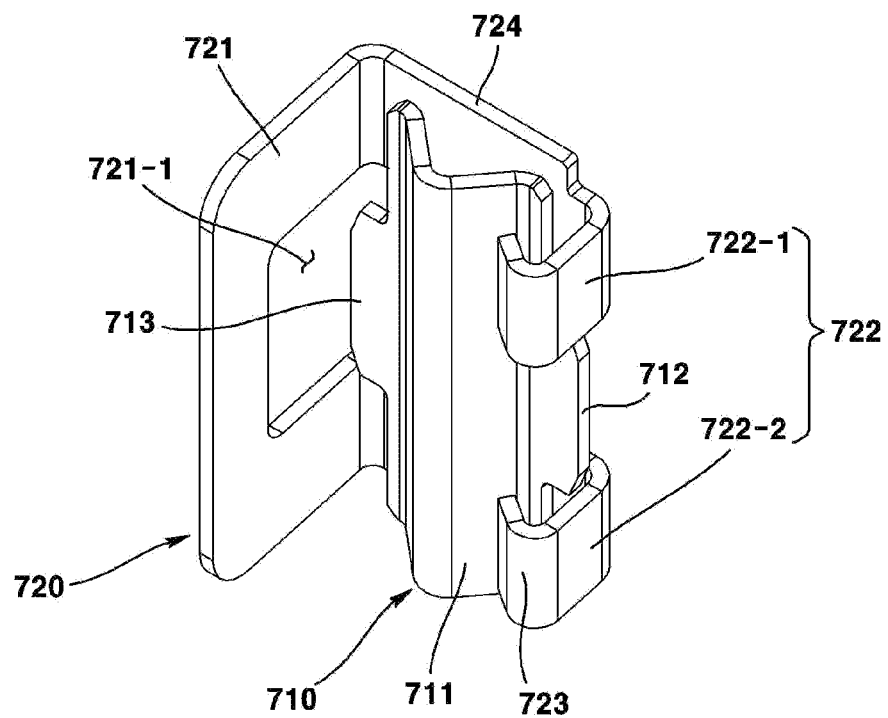
FIG. 15 is a perspective view of a first elastic member and a second elastic member of the camera module according to the present embodiment.
Figure 16:
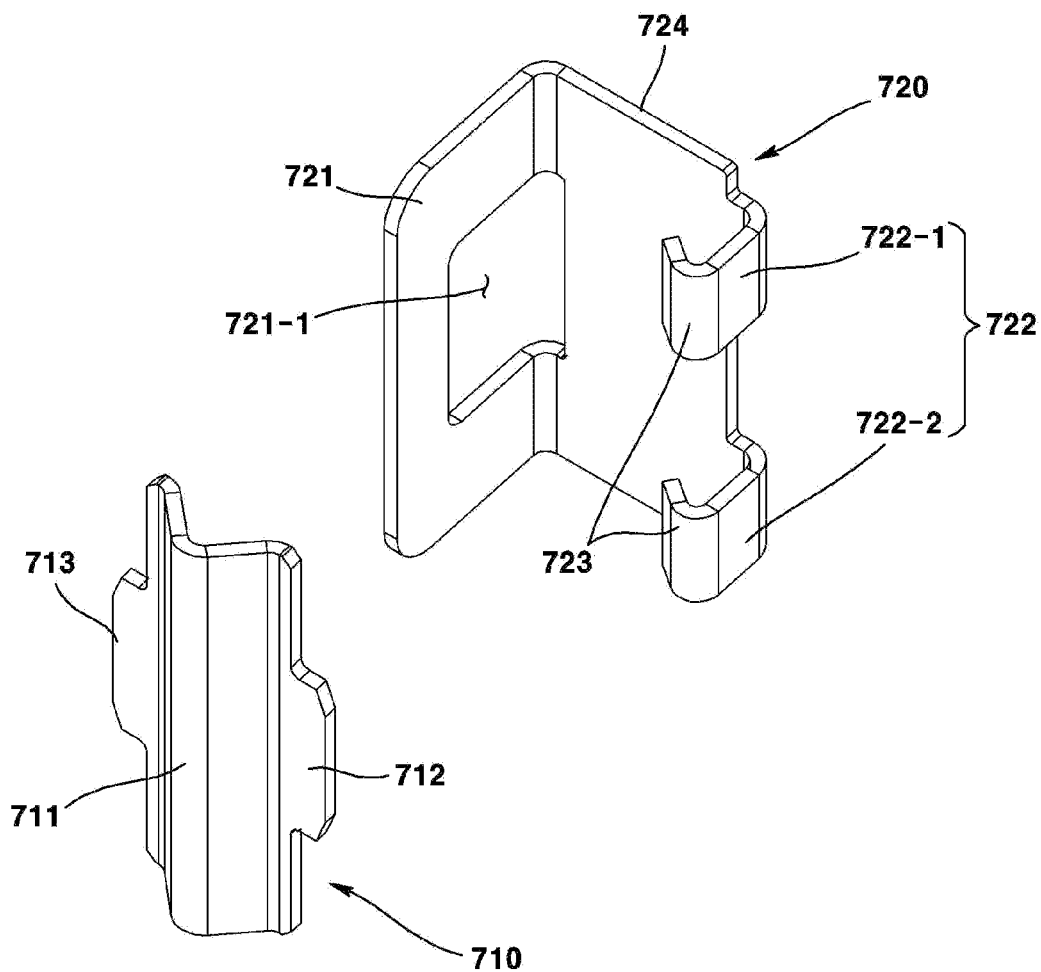
FIG. 16 is an exploded perspective view of FIG. 15.
Figure 17:
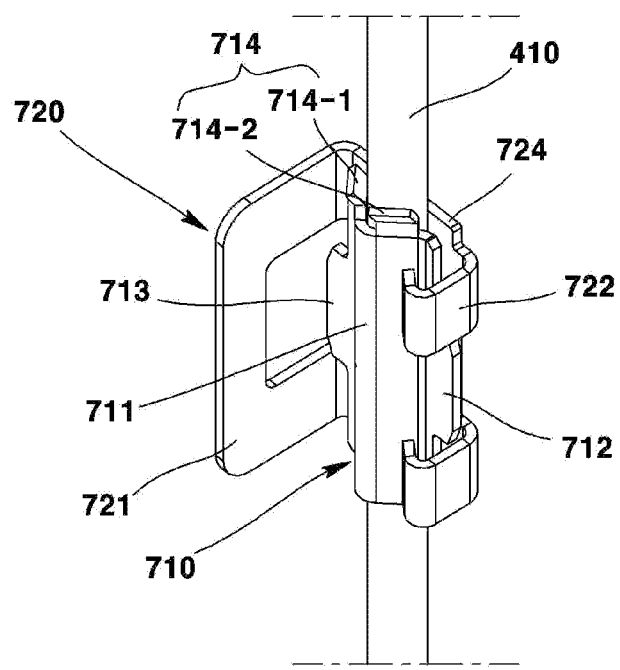
FIG. 17 is a view related to the first piezo motor, the first elastic member, and the second elastic member of the camera module according to a modified embodiment of the present embodiment.
Figure 18:
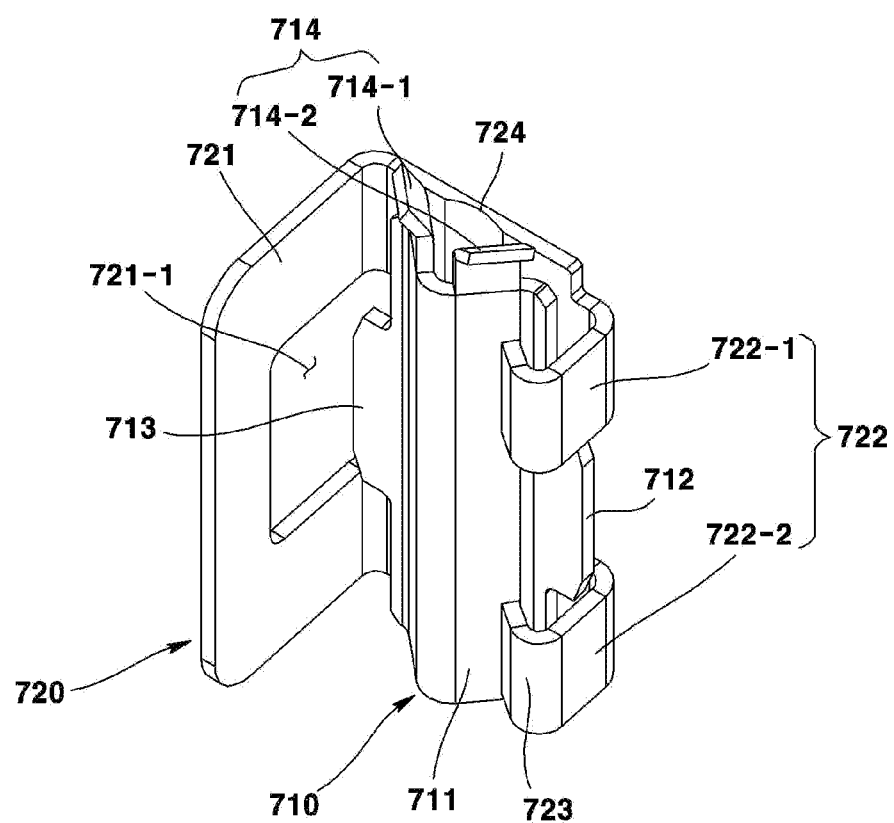
FIG. 18 is a perspective view of a first elastic member and a second elastic member of the camera module according to a modified embodiment of the present embodiment.
Figure 19:
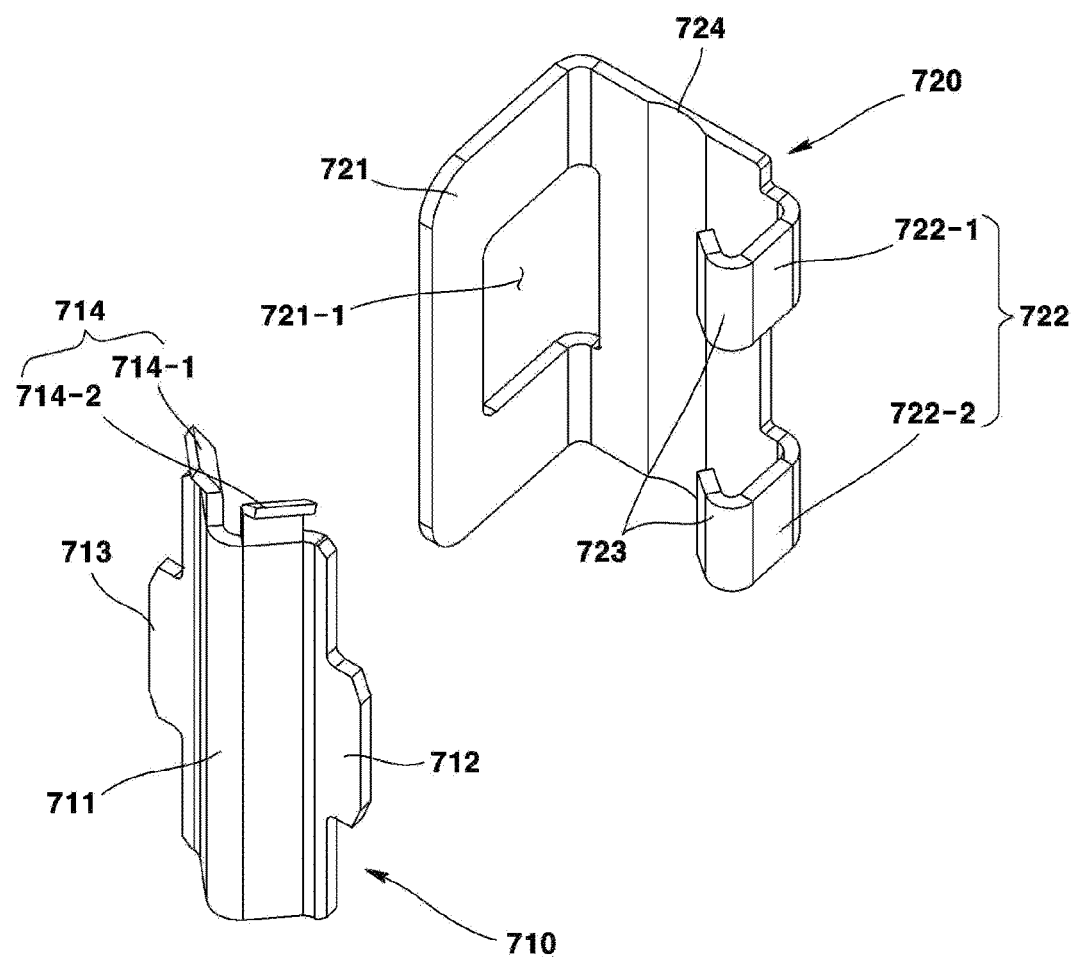
FIG. 19 is an exploded perspective view of FIG. 18

FIG. 1 is a perspective view of a camera module according to the present embodiment; FIG. 2 is a front view with an upper plate unit removed from the camera module according to the present embodiment; FIG. 3 is a cross-sectional view taken along line A-A' of FIG. 2; FIG. 4 is a perspective view with the side plate unit removed from the camera module according to the present embodiment; FIG. 5 is an exploded perspective view of a camera module according to the present embodiment; FIG. 6 is a perspective view of a first lens barrel of a camera module according to the present embodiment; FIG. 7 is an exploded perspective view of FIG. 6; FIG. 8 is a side view of a second lens barrel of the camera module according to the present embodiment; FIG. 9 is an exploded perspective view of FIG. 8; FIG. 10 is a perspective view illustrating the first lens barrel of the camera module according to the present embodiment from another angle; FIG. 11 is a perspective view illustrating a second lens barrel of the camera module according to the present embodiment from another angle; FIGS. 12 to 14 are views related to the first piezo motor, the first elastic member, and the second elastic member of the camera module according to the present embodiment; FIG. 15 is a perspective view of a first elastic member and a second elastic member of the camera module according to the present embodiment; FIG. 16 is an exploded perspective view of FIG. 15; FIG. 17 is a view related to the first piezo motor, the first elastic member, and the second elastic member of the camera module according to a modified embodiment of the present embodiment; FIG. 18 is a perspective view of a first elastic member and a second elastic member of the camera module according to a modified embodiment of the present embodiment; and FIG. 19 is an exploded perspective view of FIG. 18.

The camera module 10 may comprise a housing 100. The housing 100 may be a cover member. The housing 100 may form the outer appearance of the camera module 10. The housing 100 may have a hexahedral shape. A lens barrel may be disposed inside of the housing 100. Inside of the housing 100, at least one among a first lens barrel 200, a second lens barrel 300, a first piezo motor 400, a second piezo motor 500, a first pin 610, and a second pin 620 may be accommodated.

The housing 100 may comprise an upper plate unit 110. The upper plate unit 110 may be a lens barrel for accommodating a first lens 140. The upper plate unit 110 may have a hexahedral shape with an open lower surface. The upper plate unit 110 may comprise a hole 111. The upper plate unit 110 may accommodate the first lens 140. The first lens 140 may be disposed in the hole 111 of the upper plate unit 110. The upper plate unit 110 may comprise: an upper plate 112, a side plate 113 being extended downward from the upper plate 112; and a barrel unit 114 being protruded upward from the upper plate 112. The barrel unit 114 may accommodate the first lens 140 therein.

The upper plate unit 110 may comprise a first protrusion 115 being protruded upward from the upper plate 112. The first protrusion 115 may fix the first piezo motor 400. The first protrusion 115 may comprise a hole. The first column 410 of the first piezo motor 400 may be disposed in the hole of the first protrusion 115. At this time, at least a portion of the first column 410 of the first piezo motor 400 may be protruded more upward than the first protrusion 115. The upper plate unit 110 may comprise a second protrusion 116 being protruded upward from the upper plate 112.

It may comprise a second protrusion 116 being protruded upward from the upper surface 112. The second protrusion 116 may be spaced apart from the first protrusion 115. A barrel part 114 may be disposed between the first protrusion 115 and the second protrusion 116. The second protrusion 116 may fix the second piezo motor 500. The second protrusion 116 may comprise a hole. The second column 510 of the second piezo motor 500 may be disposed in the hole of the second protrusion 116. At this time, at least a portion of the second column 510 of the second piezo motor 500 may protrude more upward than the second protrusion 116.

The housing 100 may comprise a side plate unit 120. The side plate unit 120 may have a hexahedral shape in which the upper and lower surfaces are opened. The side plate unit 120 may be extended downward from an outer periphery or edge of the upper plate unit 110. The side plate unit 120 may be coupled to the upper plate unit 110. The side plate unit 120 may be coupled to the side plate 113 of the upper plate unit 110. The side plate unit 120 may connect the upper plate unit 110 and the lower plate unit 130.

The housing 100 may comprise a lower plate unit 130. The lower plate unit 130 may be disposed at an opposite side of the upper plate unit 110. The lower plate unit 130 may be a lens barrel for accommodating the fourth lens. The lower plate unit 130 may comprise a first hole 131. A fourth lens may be disposed in the first hole 131 of the lower plate unit 130. The lower plate unit 130 may comprise a second hole 132. The second hole 132 may fix the first piezo motor 400. The lower end of the first column 410 of the first piezo motor 400 may be disposed in the second hole 132. A holding member 134 for fixing the lower end of the first column 410 of the first piezo motor 400 may be disposed in the second hole 132. The holding member 134 may be formed of a material. The lower plate unit 130 may comprise a third hole 133. The third hole 133 may fix the second piezo motor 500. A lower end of the second column 510 of the second piezo motor 500 may be disposed in the third hole 133. A holding member 134 for fixing the lower end of the second column 510 of the second piezo motor 500 may be disposed in the third hole 133. The holding member 134 may be formed of a rubber material.

The camera module 10 according to the present embodiment may comprise a first lens 140. The first lens 140 may be a lens group comprising a plurality of lenses. The first lens 140 may comprise a spacer being disposed between the plurality of lenses. The first lens 140 may be disposed in the upper plate unit 110 of the housing 100. In the first lens 140, the upper plate unit 110 of the housing 100 may be disposed in the hole 111. The first lens 140 may be coupled to the barrel unit 114 of the upper plate unit 110 of the housing 100. The position of the first lens 140 may be fixed. The first lens 140 may not move in an optical axis direction. The optical axis direction of the first lens 140 may coincide with the optical axis direction of the second to fourth lenses.

The camera module 10 according to the present embodiment may comprise a fourth lens 150. The fourth lens 150 may be a lens group comprising a plurality of lenses. The fourth lens 150 may comprise a spacer being disposed between the plurality of lenses. The fourth lens 150 may be disposed in the lower plate unit 130 of the housing 100. The fourth lens 150 may be disposed in the first hole 131 of the lower plate unit 130 of the housing 100. The fourth lens 150 may have a fixed position. The fourth lens 150 may not move in an optical axis direction. The optical axis direction of the fourth lens 150 may coincide with the optical axis directions of the first lens 140, the second lens 240, and the third lens 340.

The camera module 10 according to the present embodiment may comprise a first lens barrel 200. The first lens barrel 200 may be disposed inside the housing 100. The first lens barrel 200 may be disposed below the upper plate unit 110 of the housing 100. The first lens barrel 200 may be disposed inside the side plate unit 120 of the housing 100.

A second lens 240 may be disposed in the first lens barrel 200. The first lens barrel 200 may be moved in an optical axis direction. The first lens barrel 200 may be moved in an optical axis direction to perform auto focus. Or, the first lens barrel 200 may be moved in an optical axis direction to perform zooming. The first lens barrel 200 may be coupled to the first piezo motor 400. The first lens barrel 200 may be coupled to the first piezo motor 400 through the first elastic member and the second elastic member.

The first lens barrel 200 may comprise a body unit 210. Hereinafter, the body unit 210 of the first lens barrel 200 may mean the first body unit 210. The first body unit 210 may have an open cylindrical shape with upper and lower surfaces. The first body unit 210 may comprise a hole 211. The second lens 240 may be disposed in the hole 211 of the first body unit 210. The second lens 240 may be coupled inside the first body unit 210. The first body unit 210 may be connected to the first coupling unit 220. The first body unit 210 may be coupled to the first coupling unit 220. The first body unit 210 may be integrally formed with the first coupling unit 220. However, the present invention is not limited thereto, and the first body unit 210 may be formed separately from the first coupling unit 220.

The first lens barrel 200 may comprise a coupling unit 220. Hereinafter, the coupling unit 220 of the first lens barrel 200 may be the first coupling unit 220. The first coupling unit 220 may be protruded from the outer circumferential surface of the first body unit 210. The first coupling unit 220 may be connected to the first body unit 210. The first coupling unit 220 may be coupled to the first body unit 210.

The first coupling unit 220 may comprise: a first outer side surface 221; a second outer side surface 222 being disposed at an opposite side of the first outer side surface 221; and a third outer side surface 223 connecting the first outer side surface 221 and the second outer side surface 222.

The first coupling unit 220 may comprise a first groove 224 into which one side of the first elastic member 710 is inserted. The first groove 224 may be formed in the third outer side surface 223 of the first coupling unit 220. The first groove 224 may be connected to a third groove 226 to be described later. The first groove 224 may be opened toward the third groove 226 of the first coupling unit 220. The first groove 224 may be formed in a region being protruded from the third outer side surface 223 of the first coupling unit 220. The bottom surface of the first groove 224 may form the same plane as the third outer side surface 223 of the first coupling unit 220. The third portion 713 of the first elastic member 710 may be disposed in the first groove 224. The length of the first groove 224 in the optical axis direction may be the same as the length in the corresponding direction of the third portion 713 of the first elastic member 710. Through this, the first elastic member 710 and the first coupling unit 220 may be fitted. Through this, the first elastic member 710 may be firmly fixed to the first coupling unit 220. The length of the first groove 224 in an optical axis direction may be the same as the length of the protrusion 229 of the first coupling unit 220 in an optical axis direction.

The first coupling unit 220 may comprise a second groove 225 into which the other side of the first elastic member 710 is inserted. The second groove 225 may be formed in the third outer side surface 223 of the first coupling unit 220. The second groove 225 may be connected to the third groove 226 of the first coupling unit 220. The second groove 225 may be opened toward the third groove 226 of the first coupling unit 220. The second groove 225 may be connected to the fourth groove 227 of the first coupling unit 220. The second groove 225 may be opened toward the fourth groove 227 of the first coupling unit 220. The second groove 225 may be connected to the inner side surface of the fourth groove 227 of the first coupling unit 220. At least a portion of the second groove 225 may be overlapped with the fifth groove 228 of the first coupling unit 220 in a direction perpendicular to the optical axis direction. At least a portion of the second groove 225 may be overlapped with the two fifth grooves 228 in a direction perpendicular to the optical axis direction. The second groove 225 may be formed in a region being protruded from the third outer side surface 223 of the first coupling unit 220. The bottom surface of the second groove 225 may form the same plane as the third outer side surface 223 of the first coupling unit 220. The length of the second groove 225 in an optical axis direction may be the same as the length of the second portion 712 of the first elastic member 710 in the corresponding direction. Through this, the first elastic member 710 and the first coupling unit 220 may be fitted. Through this, the first elastic member 710 may be firmly fixed to the first coupling unit 220.

The first coupling unit 220 may comprise a groove 226. Hereinafter, the groove 226 of the first coupling unit 220 may be a third groove 226. The third groove 226 may be formed in a third outer side surface 223. The third groove 226 may be formed by being recessed from the third outer side surface 223. The third groove 226 may be formed in a 'V' shape. The third groove 226 may comprise an inclined surface being inclinedly formed against the third outer side surface 223. The inclined surface of the third groove 226 may comprise two inclined surfaces. The two inclined surfaces may have different inclined directions. A first elastic member 710 may be disposed in the third groove 226. The first column 410 of the first piezo motor 400 may be disposed in the third groove 226.

The first coupling unit 220 may comprise a groove 227. Hereinafter, the groove 225 of the first coupling unit 220 may mean a fourth groove 227. The fourth groove 227 may be formed in a third outer side surface 223 of the coupling unit 220. The fourth groove 227 may be formed by being recessed from the third outer side surface 223 of the coupling unit 220. The fourth groove 227 may be spaced apart from the third groove 226. One side of the second elastic member 720 may be disposed in the fourth groove 227. The fourth groove 227 may be coupled to one side of the second elastic member 720.

The fourth groove 227 may comprise a groove 228. Hereinafter, the groove 228 may refer to a fifth groove 228. The fifth groove 228 may be formed on the inner side surface of the fourth groove 227. The inner side surface of the fourth groove 227 may be disposed at an opposite side of the first outer side surface 221 of the first coupling unit 220. The inner side surface of the fourth groove 227 may be disposed between the first outer side surface 221 of the first coupling unit 220 and the second outer side surface 222 of the first coupling unit 220. At least a portion of one side of the second elastic member 720 may be disposed in the fifth groove 228. At least a portion of one side of the fifth groove 228 and the second elastic member 720 may be hook-coupled. The fifth groove 228 may be disposed so that at least a portion of one side of the second elastic member 720 is caught. The fifth groove 228 may comprise two fifth grooves 228-1 and 228-2 spaced apart from each other in an optical axis direction. At least a portion of one side of the second elastic member 720 may be disposed in each of the two fifth grooves 228-1 and 228-2.

The first coupling unit 220 may comprise a protrusion 229. The protrusion 229 may be protruded from the first outer side surface 221 of the first coupling unit 220. The protrusion 229 may be coupled to the other side of the second elastic member 720. The protrusion 229 may penetrate the hole 721-1 being formed on the other side of the second elastic member 720. The protrusion 229 may be coupled to the other side of the second elastic member 720 in a clip manner. The protrusion 229 may be protruded outward from the other side of the second elastic member 720. Through this, it is possible to prevent the second elastic member 720 from being separated.

The first lens barrel 200 may comprise a first protruded part 230. The first protruded part 230 may be protruded from the outer circumferential surface of the first body unit 210. The first protruded part 230 may be spaced apart from the first coupling unit 220. The first protruded part 230 may be spaced apart from the first coupling unit 200 in the circumferential direction of the first body unit 210. The first protruded part 230 may be disposed at an opposite side of the first coupling unit 220 with respect to the optical axis direction. A first pin 600 may be disposed in the first protruded part 230. Through this, the first lens barrel 200 may be moved along the first pin 610 in an optical axis direction. The first lens barrel 200 may be moved along the first pin 610 and the second pin 620 in an optical axis direction.

The first lens barrel 200 may comprise a second lens 240. The second lens 240 may be a lens group comprising a plurality of lenses. The second lens 240 may comprise a spacer being disposed between the plurality of lenses. The second lens 240 may move in an optical axis direction. The second lens 240 may be individually movable from the third lens 340. When the second lens 240 is a lens for auto focus, the third lens 340 may be a zoom lens. Conversely, when the second lens 240 is a zoom lens, the third lens 340 may be a lens for autofocus. The movable distance of the second lens 240 may be different from the movable distance of the third lens 340.

The first lens barrel 230 may comprise a groove 260. The groove 260 may be formed in the first coupling unit 220. The groove 260 may be formed in the second outer side surface 222 of the first coupling unit 220. The groove 260 may be recessed from the second outer side surface 222 of the first coupling unit 220. At least a portion of the groove 260 may communicate with the fourth groove 227 of the first coupling unit 220. A first sensor assembly 250 to be described later may be disposed in the groove 260. A first magnetic scale 251 of a first sensor assembly 250 to be described later may be disposed in the groove 260. The length of the groove 260 in an optical axis direction may correspond to the length of the first magnetic scale 251 in an optical axis direction. The width of the groove 260 in a first direction perpendicular to the optical axis direction may comprise a region being formed to correspond to the width of the first magnetic scale 251 in a first direction and a region being formed longer than the width of the first magnetic scale 251 in a first direction. Through this, the assembly of the first magnetic scale 251 may become easy.

The camera module 10 may comprise a first sensor assembly 250. The first sensor assembly 250 may comprise a magnetoresistor sensor (MR sensor). The first sensor assembly 250 may comprise a giant magnetoresistor sensor (GMR sensor). The first sensor assembly 250 may detect the position and movement of the second lens 240.

The first sensor assembly 250 may comprise a first magnetic scale 251. The first magnetic scale 251 may be disposed in the first lens barrel 200. The first magnetic scale 251 may be disposed in the first coupling unit 220. The first magnetic scale 251 may comprise a magnet. The first magnetic scale 251 may comprise a plurality of magnets. In the first magnetic scale 251, the N pole and the S pole may be disposed to cross each other. In the first magnetic scale 251, N poles and S poles may be alternately disposed. The first magnetic scale 251 may be moved along the optical axis direction together with the first lens barrel 200.

The first sensor assembly 250 may comprise a first sensor 252. The first sensor 252 may be disposed in the housing 100. The first sensor 252 may be disposed in the side plate unit 120 of the housing 100. The first sensor 252 may face the first magnetic scale 251. The first sensor 252 may be disposed to be spaced apart from the first magnetic scale 251 in a direction perpendicular to the optical axis. The first sensor 252 may recognize the position of the first magnetic scale 251. Through this, the position of the first lens barrel 200 moving together with the first magnetic scale 251 may be recognized.

The camera module 10 according to the present embodiment may comprise a second lens barrel 300. The second lens barrel 300 may be disposed inside the housing 100. The second lens barrel 300 may be disposed below the first lens barrel 200 of the housing 100. The second lens barrel 300 may be disposed inside the side plate unit 120 of the housing 100. A third lens 340 may be disposed inside the second lens barrel 300. The second lens barrel 300 may be moved in an optical axis direction. The second lens barrel 300 may be moved in an optical axis direction to perform auto focus. Or, the second lens barrel 300 may be moved in an optical axis direction to perform zooming. The second lens barrel 300 may be coupled to the second piezo motor 500. The second lens barrel 300 may be coupled with the second piezo motor 500 through the third elastic member 810 and the fourth elastic member 820.

The second lens barrel 300 may comprise a second body unit 310. The second body unit 310 may be a cylindrical shape with upper and lower surfaces open. The second body unit 310 may comprise a hole 311. A third lens 340 may be disposed in the hole 311 of the second body unit 310. A third lens 340 may be coupled inside the second body unit 310.

The second lens barrel 300 may comprise a coupling unit 320. Hereinafter, the coupling unit 320 of the second lens barrel 300 may mean the second coupling unit 320. The second coupling unit 320 may be protruded from an outer circumferential surface of the second body unit 310. The second coupling unit 320 may be connected to the second body unit 310. The second coupling unit 320 may be coupled to the second body unit 310.

The second coupling unit 320 may comprise: a first outer side surface 321; a second outer side surface 322 being disposed at an opposite side of the first outer side surface 321; and a third outer side surface 323 connecting the first outer side surface 321 and the second outer side surface 322.

The second coupling unit 320 may comprise a first groove 324 into which one side of the third elastic member 810 is inserted. The first groove 324 may be formed in the third outer side surface 323 of the second coupling unit 320. The first groove 324 may be connected to a third groove 326 to be described later. The first groove 324 may be opened toward the third groove 326 of the second coupling unit 320. The first groove 324 may be formed in a region being protruded from the third outer side surface 323 of the second coupling unit 320. The bottom surface of the first groove 324 may form the same plane as the third outer side surface 323 of the second coupling unit 320. The third portion 713 of the third elastic member 810 may be disposed in the first groove 324. The length of the first groove 324 in an optical axis direction may be the same as the length of the third portion 813 of the third elastic member 810 in the corresponding direction. Through this, the third elastic member 810 and the second coupling unit 320 may be fit-coupled. Through this, the third elastic member 810 may be firmly fixed to the second coupling unit 320. The length of the first groove 324 in an optical axis direction may be the same as the length of the protrusion 329 of the second coupling unit 320 in an optical axis direction.

The second coupling unit 320 may comprise a second groove 325 into which the other side of the third elastic member 810 is inserted. The second groove 325 may be formed in the third outer side surface 323 of the second coupling unit 320. The second groove 325 may be connected to the third groove 326 of the second coupling unit 320. The second groove 325 may be opened toward the third groove 326 of the second coupling unit 320. The second groove 325 may be connected to the fourth groove 327 of the second coupling unit 320. The second groove 325 may be opened toward the fourth groove 327 of the second coupling unit 320. The second groove 325 may be connected to the inner surface of the fourth groove 327 of the second coupling unit 320. At least a portion of the second groove 325 may be overlapped with the fifth groove 328 of the second coupling unit 320 in a direction perpendicular to the optical axis direction. At least a portion of the second groove 325 may be overlapped with the two fifth grooves 328 in a direction perpendicular to the optical axis direction. The second groove 325 may be formed in a region being protruded from the third outer side surface 323 of the second coupling unit 320. The bottom surface of the second groove 325 may form the same plane as the third outer side surface 323 of the second coupling unit 320. The length of the second groove 325 in an optical axis direction may be the same as the length of the second portion 812 of the third elastic member 810 in the corresponding direction. Through this, the third elastic member 810 and the second coupling unit 320 may be fit-coupled. Through this, the third elastic member 810 may be firmly fixed to the second coupling unit 320.

The second coupling unit 320 may comprise a groove 326. Hereinafter, the groove 326 of the second coupling unit 320 may mean the third groove 326. The third groove 326 may be formed in the third outer side surface 323. The third groove 326 may be formed by being recessed from the third outer side surface 323. The third groove 326 may be formed in a 'V' shape. The third groove 326 may comprise an inclined surface being inclinedly formed against the third outer side surface 323. The inclined surface of the third groove 326 may comprise two inclined surfaces. The two inclined surfaces may have different inclined directions. A third elastic member 810 may be disposed in the third groove 326. The second column 420 of the second piezo motor 400 may be disposed in the third groove 326.

The second coupling unit 320 may comprise a groove 327. Hereinafter, the groove 327 of the second coupling unit 320 may mean the fourth groove 327. The fourth groove 327 may be formed in the third outer side surface 323 of the second coupling unit 320. The fourth groove 327 may be formed by being recessed from the third outer side surface 323 of the second coupling unit 320.

The fourth groove 327 may comprise a plurality of grooves 328. Hereinafter, the groove 328 may refer to the fifth groove 328. The fifth groove 328 may be formed in the inner side surface of the fourth groove 327. The inner side surface of the fourth groove 327 may be disposed at an opposite side of the first outer side surface 321 of the second coupling unit 320. The inner side surface of the fourth groove 327 may be disposed between the first outer side surface 321 of the second coupling unit 320 and the second outer side surface 322 of the second coupling unit 320. At least a portion of one side of the second elastic member 720 may be disposed in the fifth groove 328. At least a portion of one side of the fifth groove 328 and the second elastic member 720 may be hook-coupled. The fifth groove 328 may be disposed so that at least a portion of one side of the fourth elastic member 820 is caught. The fifth groove 328 may comprise two fifth grooves 328-1 and 328-2 being spaced apart from each other in an optical axis direction. At least a portion of one side of the fourth elastic member 720 may be disposed in each of the two fifth grooves 328-1 and 328-2.

The second coupling unit 320 may comprise a protrusion 329. In the protrusion 329, the second coupling unit 320 may be protruded from the first outer side surface 321. The protrusion 329 may be coupled to the other side of the fourth elastic member 820. The protrusion 329 may penetrate the hole 821-1 being formed on the other side of the fourth elastic member 820. The protrusion 329 may be coupled to the other side of the fourth elastic member 820 in a clip manner. The protrusion 329 may be protruded more outward than the other side of the fourth elastic member 820. Through this, it is possible to prevent the fourth elastic member 820 from being separated.

The second coupling unit 320 may comprise a groove 326 being formed in the third outer side surface 323. The groove 326 may be formed in a 'V' shape. The groove 326 may comprise an inclined surface being inclinedly formed with respect to the third outer side surface 323. The inclined surface of the groove 326 may comprise two inclined surfaces. The two inclined surfaces may have different inclined directions. A third elastic member 810 may be disposed in the groove 226. The second column 420 of the second piezo motor 400 may be disposed in the groove 226.

The second lens barrel 300 may comprise a second protruded part 330. The second protruded part 330 may be protruded from the outer circumferential surface of the second body unit 310. The second protruded part 330 may be spaced apart from the second coupling unit 320. The second protruded part 330 may be spaced apart from the second coupling unit 320 in the circumferential direction of the second body unit 310. The second protruded part 330 may be disposed at an opposite side of the second coupling unit 320 with respect to the optical axis direction. A first pin 610 may be disposed in the second protruded part 330. Through this, the second lens barrel 300 may be moved along the first pin 610 in an optical axis direction. The second lens barrel 300 may be moved along the first pin 610 and the second pin 620 in an optical axis direction.

The second lens barrel 300 may comprise a third lens 340. The third lens 340 may be disposed in the second body unit 310 of the second lens barrel 300. The third lens 340 may be a lens group comprising a plurality of lenses. The third lens 340 may comprise a spacer disposed between the plurality of lenses. The third lens 340 may move in an optical axis direction. The third lens 340 may be individually movable from the second lens 240. When the third lens 340 is a lens for autofocus, the second lens 240 may be a zoom lens. Conversely, when the third lens 340 is a zoom lens, the second lens 240 may be a lens for auto focus. The movable distance of the third lens 340 may be different from the movable distance of the second lens 240.

The second lens barrel 330 may comprise a groove 360. The groove 360 may be formed in the second coupling unit 320. The groove 360 may be formed in the second outer side surface 322 of the second coupling unit 320. The groove 360 may be recessed from the second outer side surface 322 of the second coupling unit 320. At least a portion of the groove 360 may communicate with the fourth groove 327 of the second coupling unit 320. A second sensor assembly 350 to be described later may be disposed in the groove 360. A second magnetic scale 351 of a second sensor assembly 350 to be described later may be disposed in the groove 360. The length of the groove 360 in an optical axis direction may correspond to the length of the second magnetic scale 351 in an optical axis direction. The width of the groove 360 in the first direction perpendicular to the optical axis direction may comprise a region formed to correspond to the width of the second magnetic scale 351 in the first direction and a region formed longer than the width of the second magnetic scale 351 in the first direction. Through this, the assembly of the second magnetic scale 351 may become easy.

The camera module 10 may comprise a first sensor assembly 250. The first sensor assembly 250 may comprise a magnetoresistor sensor (MR sensor). The first sensor assembly 250 may comprise a giant magnetoresistor sensor (GMR sensor). The first sensor assembly 250 may detect the position and movement of the second lens 240.

The first sensor assembly 250 may comprise a first magnetic scale 251. The first magnetic scale 251 may be disposed in the first lens barrel 200. The first magnetic scale 251 may be disposed in the first coupling unit 220. The first magnetic scale 251 may comprise a magnet. The first magnetic scale 251 may comprise a plurality of magnets. In the first magnetic scale 251, N poles and the S poles may be disposed to cross each other. In the first magnetic scale 251, N poles and S poles are alternately disposed. The first magnetic scale 251 may be moved along an optical axis direction together with the first lens barrel 200.

The first sensor assembly 250 may comprise a first sensor 252. The first sensor 252 may be disposed in the housing 100. The first sensor 252 may be disposed in the side plate unit 120 of the housing 100. The first sensor 252 may face the first magnetic scale 251. The first sensor 252 may be disposed to be spaced apart from the first magnetic scale 251 in a direction perpendicular to the optical axis. The first sensor 252 may recognize the position of the first magnetic scale 251. Through this, the position of the first lens barrel 200 moving together with the first magnetic scale 251 may be recognized.

The camera module 10 may comprise a second sensor assembly 350. The second sensor assembly 350 may comprise a magnetoresistor sensor (MR sensor). The second sensor assembly 350 may comprise a giant magnetoresistor sensor (GMR sensor). The second sensor assembly 350 may detect the position and movement of the third lens 340.

The second sensor assembly 350 may comprise a second magnetic scale 351. The second magnetic scale 351 may be disposed in the second lens barrel 300. The second magnetic scale 351 may be disposed in the second coupling unit 320. The second magnetic scale 351 may comprise a magnet. The first magnetic scale 351 may comprise a plurality of magnets. In the first magnetic scale 351, N poles and the S poles may be disposed to cross each other. In the first magnetic scale 351, N poles and S poles are alternately disposed. The first magnetic scale 351 may be moved along an optical axis direction together with the first lens barrel 200.

The second sensor assembly 350 may comprise a second sensor 352. The second sensor 352 may be disposed in the housing 100. The second sensor 352 may be disposed in the side plate unit 120 of the housing 100. The second sensor 352 may face the second magnetic scale 351. The second sensor 352 may be disposed to be spaced apart from the second magnetic scale 351 in a direction perpendicular to the optical axis. The second sensor 352 may recognize the position of the second magnetic scale 351. Through this, the position of the second lens barrel 300 moving together with the second magnetic scale 351 may be recognized.

The camera module 10 may comprise a second sensor assembly 350. The second sensor assembly 350 may comprise a magnetoresistor sensor (MR sensor). The second sensor assembly 350 may comprise a giant magnetoresistor sensor (GMR sensor). The second sensor assembly 350 may detect the position and movement of the third lens 340.

The camera module 10 according to the present embodiment may comprise a first piezo motor 400. The first piezo motor 400 may be disposed in the housing 100. The first piezo motor 400 may be coupled to the first lens barrel 200. The first piezo motor 400 may move the first lens barrel 200 in an optical axis direction. The first piezo motor 400 may be an ultrasonic motor.

The first piezo motor 400 may comprise a first column 410. The first column 410 may be coupled to the first lens barrel 200. The first column 410 may be fixed to the first lens barrel 200 by a first elastic member and a second elastic member. The first column 410 may not move when the first lens barrel 200 is moved in an optical axis direction. The upper end of the first column 410 may be disposed in the upper plate unit 110 of the housing 100. The upper end of the first column 410 may be disposed in the hole 111 of the upper plate unit 100 of the housing 100. An upper end of the first column 410 may be fixed by a holding member 134. The other end of the first column 410 may be disposed in the lower plate unit 130 of the housing 100. The other end of the first column 410 may be disposed in the second hole 132 of the lower plate unit 130 of the housing 100. The other end of the first column 410 may penetrate through the second hole 132 of the lower plate unit 130 of the housing 100 to be protruded out of the lower plate unit 130. A lower end of the first column 410 may be coupled to the first piezoelectric element 420. The lower end of the first column 410 may be fixed to the first piezoelectric element 420 by an adhesive. At this time, the adhesive may comprise an epoxy-based adhesive. The first column 410 may comprise a carbon rod. The first column 410 may receive the vibration generated from the first piezoelectric element 420 to move the first lens barrel 200 in an optical axis direction. The first column 410 may be extended parallel to the optical axis direction. The first column 410 may be disposed in the first coupling unit 220 of the first lens barrel 200. The first column 410 may be disposed between the first elastic member and the second elastic member.

The first column 410 may transfer the vibration generated from the first piezoelectric element 420 to the first lens barrel 200. At this time, the first lens barrel 200 may be moved upward or downward according to the movement direction of the first column 410. Through this, the second lens 240 in the first lens barrel 200 is moved together, and a zooming function or an autofocus function of zooming up or zooming out may be performed. The first column 410 may be contracted or expanded by vibration generated from the first piezoelectric element 420. The first column 420 may transfer the vibration in an upper direction or a lower direction according to a direction in which a voltage is applied.

The first piezo motor 400 may comprise a first piezoelectric element 420. The first piezoelectric element 420 may be disposed in the lower plate unit 130 of the housing 100. The first piezoelectric element 420 may be disposed in the second hole 132 of the lower plate unit 130 of the housing 100. The first piezoelectric element 420 may be contracted or expanded by a voltage applied from the first substrate 430. The first piezoelectric element 420 may receive a voltage from the first substrate 430. The first piezoelectric element 420 may contract or expand along an optical axis direction. The first piezoelectric element 420 may contract or expand in a lengthwise direction thereof according to a direction in which a voltage is applied. The first piezoelectric element 420 may generate vibration by contracting or expanding.

The first piezo motor 400 may comprise a first substrate 430. The first substrate 430 may comprise a flexible printed circuit substrate. The first substrate 430 may be electrically connected to the first piezoelectric element 420. The first substrate 430 may apply power to the first piezoelectric element 420. The first substrate 430 may comprise a first portion 431 being disposed in the first piezoelectric element 420 and a second portion 432 being disposed below the first piezoelectric element 420. The first substrate 430 may be protruded toward the outside of the housing 100.

The first piezo motor 400 may comprise a first buffer member 440. The first buffer member 440 may be disposed in the first column 410. The first buffer member 440 may surround the lower end of the first column 410. The first buffer member 440 may be disposed in the second hole 132 of the lower plate unit 130. The first buffer member 440 may prevent noise caused by the vibration of the first column 410. It is possible to prevent deformation or destruction of the first column 410 by an external impact together with the first buffer member 440 and the holding member 134.

The camera module 10 according to the present embodiment may comprise a second piezo motor 500. The second piezo motor 500 may be disposed in the housing 100. The second piezo motor 500 may be coupled to the second lens barrel 300. The second piezo motor 500 may move the second lens barrel 300 in an optical axis direction. The second piezo motor 500 may be an ultrasonic motor.

The second piezo motor 500 may comprise a second column 510. The second column 510 may be coupled to the second lens barrel 300. The second column 510 may be fixed to the second lens barrel 300 by a third elastic member 810 and a fourth elastic member 820. The second column 410 may not move when the second lens barrel 300 is moved in an optical axis direction. The upper end of the second column 510 may be disposed in the upper plate unit 110 of the housing 100. The upper end of the second column 510 may be disposed in the hole 111 of the upper plate unit 100 of the housing 100. An upper end of the second column 510 may be fixed by a holding member 134. The other end of the second column 510 may be disposed in the lower plate unit 130 of the housing 100. The other end of the second column 510 may be disposed in the third hole 133 of the lower plate unit 130 of the housing 100. The other end of the second column 510 may penetrate through the third hole 133 of the lower plate unit 130 of the housing 100 to be protruded out of the lower plate unit 130. A lower end of the second column 510 may be coupled to the second piezoelectric element 520. The lower end of the second column 510 may be fixed to the second piezoelectric element 520 by an adhesive. At this time, the adhesive may comprise an epoxy-based adhesive. The second column 510 may comprise a carbon rod. The second column 510 may receive the vibration generated from the second piezoelectric element 520 to move the second lens barrel 300 in an optical axis direction. The second column 510 may be extended parallel to the optical axis direction. The second column 510 may be disposed in the first coupling unit 220 of the second lens barrel 300. The second column 510 may be disposed between the third elastic member 810 and the fourth elastic member 820.

The second column 510 may transfer the vibration generated from the first piezoelectric element 420 to the second lens barrel 300. At this time, the second lens barrel 300 may be moved upward or downward according to the movement direction of the second column 510. Through this, the second lens 240 in the second lens barrel 300 is moved together, and a zooming function or an autofocus function of zooming up or zooming out may be performed. The second column 510 may be contracted or expanded by vibration generated from the first piezoelectric element 420. The second column 510 may transfer the vibration in an upper direction or a lower direction according to a direction in which a voltage is applied.

The second piezo motor 500 may comprise a second piezoelectric element 520. The second piezoelectric element 520 may be disposed in the lower plate unit 130 of the housing 100. The second piezoelectric element 520 may be disposed in the third hole 133 of the lower plate unit 130 of the housing 100. The first piezoelectric element 420 may be contracted or expanded by a voltage applied from the second substrate 530. The first piezoelectric element 420 may receive a voltage from the second substrate 530. The first piezoelectric element 420 may be contracted or expanded along the optical axis direction. The first piezoelectric element 420 may contract or expand in a longitudinal direction thereof according to a direction in which a voltage is applied. The first piezoelectric element 420 may generate vibration by contracting or expanding.

The second piezo motor 500 may comprise a second substrate 530. The second substrate 530 may comprise a flexible printed circuit substrate. The second substrate 530 may be electrically connected to the first piezoelectric element 420. The second substrate 530 may apply power to the first piezoelectric element 420. The first substrate 430 may comprise a first portion 531 being disposed above the first piezoelectric element 420 and a second portion 532 being disposed below the first piezoelectric element 420. The first substrate 430 may be protruded toward the outside of the housing 100.

The second piezo motor 500 may comprise a first buffer member 540. The first buffer member 540 may be disposed in the second column 510. The first buffer member 540 may surround the lower end of the second column 510. The first buffer member 540 may be disposed in the second hole 132 of the lower plate unit 130. The first buffer member 430 may prevent noise caused by the vibration of the second column 510. It is possible to prevent deformation or destruction of the second column 510 by an external impact together with the first buffer member 430 and the holding member 134.

The camera module 10 according to the present embodiment may comprise a first pin 610. The first pin 610 may be disposed inside the housing 100. The first pin 610 may be disposed in parallel with a second pin 620 to be described later in the housing 100. The first pin 610 may be disposed closer to the first piezo motor 400 than the second pin 620. The first pin 610 may be coupled to the upper plate unit 110 of the housing 100. The upper end of the first pin 610 may be coupled to the upper plate unit 110 of the housing 100. The first pin 610 may be disposed in the first coupling unit 220. The first pin 610 may penetrate through the hole 270 of the first coupling unit 220. Through this, the first pin 610 may guide the movement of the first lens barrel 200 in an optical axis direction. Through this, the second lens 240 being disposed in the first lens barrel 200 may perform a zooming function or an autofocus function. The first pin 610 may be coupled to the second lens barrel 300. The first pin 610 may be disposed in the second protruded part 330 of the second lens barrel 300. Through this, the first pin 610 may guide the movement of the second lens barrel 300 in an optical axis direction. That is, the first pin 610 is disposed in the hole of the first coupling unit 220 of the first lens barrel 200 and the second protruded part 330 of the second lens barrel 300 so that it is possible to guide the movement of the first lens barrel 200 and the second protruded part 330 in an optical axis direction.

The camera module 10 according to the present embodiment may comprise a second pin 620. The second pin 620 may be disposed inside the housing 100. The second pin 620 may be disposed parallel to the first column 610 inside the housing 100. The second pin 620 may be disposed closer to the second piezo motor 500 than the first pin 610. The second pin 620 may be coupled to the upper plate unit 110 of the housing 100. The upper end of the second pin 620 may be coupled to the upper plate unit 110 of the housing 100. The second pin 620 may be disposed in the second coupling unit 320. The second pin 620 may penetrate through the hole 370 of the second coupling unit 320. Through this, the second pin 620 may guide the movement of the second lens barrel 300 in an optical axis direction. Through this, the third lens 340 being disposed on the second lens barrel 300 may perform a zooming function or an autofocus function. The second pin 620 may be coupled to the first lens barrel 200. The second pin 620 may be disposed on the first protruded part 230 of the first lens barrel 200. Through this, the second pin 610 may guide the movement of the first lens barrel 200 in an optical axis direction. That is, the second pin 620 is disposed on the second coupling unit 320 of the second lens barrel 300 and the first protruded part 230 of the first lens barrel 200 so that the movement of the first lens barrel 200 and the second lens barrel 300 in the optical axis direction may be guided.

The camera module 10 according to the present embodiment may comprise a first elastic member 710. The first elastic member 710 may fix the first piezo motor 400 to the first lens barrel 200. The first elastic member 710 may be disposed on the second outer side surface 222 of the first coupling unit 220. The first elastic member 710 may be spaced apart from the second elastic member 720. The first elastic member 710 may be spaced apart from the second elastic member 720 in a direction perpendicular to the optical axis direction.

The first elastic member 710 may comprise a first portion 711. The first portion 711 may be formed in a shape corresponding to the groove 224 of the second outer side surface 222 of the first coupling unit 220. The first portion 711 may be formed in a 'V' shape in cross section. The first portion 711 may comprise a first inclined surface being inclined with respect to the second portion 712 and a second inclined surface being inclined with respect to the second portion 713. The first inclined surface and the second inclined surface can be formed integrally. The inclined direction of the first inclined surface may be different from the inclined direction of the second inclined surface. The inclined direction of the first inclined surface may be opposite to the inclined direction of the second inclined surface. The first inclined surface may be disposed between the first portion 711 and the second portion 712. The second inclined surface may be disposed between the first portion 711 and the third portion 713. The first portion 711 may have a first length in an optical axis direction.

The first elastic member 710 may comprise a second portion 712. The second portion 712 may be extended from one end of the first portion 711 in a direction perpendicular to the optical axis direction. The second portion 712 may be extended in a direction perpendicular to the optical axis direction from the outer side surface of the first portion 711. A length of the second portion 712 in an optical axis direction may be smaller than a length of the first portion 711 in an optical axis direction. The second portion 712 may be disposed between the two second regions of the second elastic member 720. The second portion 712 may have a second length in an optical axis direction. The second length of the second portion 712 may be smaller than the second length of the first portion 711. The second portion 712 may be extended from the first portion 711. The second portion 712 may have the same length in an optical axis direction of the third portion 713 of the first elastic member 710 to be described later. The second portion 712 and the third portion 713 may be formed symmetrically with respect to the first portion 711. The second portion 712 may be parallel to the third region 724 of the second elastic member 720.

The first elastic member 710 may comprise a third portion 713. The third portion 713 may be extended from the other end of the first portion 711 in a direction perpendicular to the optical axis direction. The third portion 713 may be extended in a direction perpendicular to the optical axis direction from the outer side surface of the first portion 711. The third portion 713 may have a second length in an optical axis direction. The second length in an optical axis direction of the third portion 713 may be smaller than a first length in the optical axis direction of the first portion 711. The second length of the third portion 713 in an optical axis direction may be the same as the length of the second portion 712 in an optical axis direction. The third portion 713 may be overlapped with the second portion 712 in a direction perpendicular to the optical axis direction. The third portion 713 may be disposed in the hole of the first region of the second elastic member 720. The second portion 712 and the third portion 713 may not be in contact with the first column 410 of the first piezo motor 400. The third portion 713 may be parallel to the third region 724 of the second elastic member 720.

In a modified embodiment, the first elastic member 710 may further comprise an extension part 714. The extension part 714 may be extended from the first portion 711 of the first elastic member 710. The extension part 714 may be bent at a first angle with respect to the first portion 711 of the first elastic member 710. A surface of the extension part 714 facing the first coupling unit 220 may form an acute angle with the first portion 711 of the first elastic member 710. A surface of the extension part 714 facing the second elastic member 720 may form an obtuse angle with the first portion 711. The extension part 714 may not come into contact with the first column 410 of the first piezo motor 400. Through this, the insertion of the first column 410 may become easy. In addition, the first column 410 may be easily press-fitted between the first elastic member 710 and the second elastic member 720 having high elastic strength. The extension part 714 may comprise a first extension part 714-1 being extended from the first inclined surface of the first portion 711 and a second extension part 714-2 being extended from the second inclined surface of the first portion 711. The first extension part 714-1 may be spaced apart from the second extension part 714-2 at least in part. The separation distance between the first extension part 714-1 and the second extension part 714-2 may increase as it travels upward. The first extension part 714-1 and the second extension part 714-2 may not be contact with the first column 410. The first extension part 714-1 and the second extension part 714-2 may guide the first column 410 when the first column 410 is assembled.

The camera module 10 according to the present embodiment may comprise a second elastic member 720. The second elastic member 720 may be formed of an elastic material. The second elastic member 720 may be disposed to be caught in the groove 224 of the second outer side surface 222 of the first coupling unit 220. The second elastic member 720 may press the first piezo motor 400 in a direction toward the first lens barrel 200. Through this, the second elastic member 720 may fix the first piezo motor 400 to the first lens barrel 200. The second elastic member 720 is coupled to the fifth groove 228 of the first coupling unit 220 through a hook shape on one side, and it may be coupled with the protrusion 229 of the first coupling unit 220 through the opening shape 721-1 of the other side.

The second elastic member 720 may comprise a first region 721 being disposed on one side surface of the first coupling unit 220, a second region 722 being disposed on the other side surface of the first coupling unit 220, and a third region 724 connecting the first region 721 and the second region 722.

The first region 721 of the second elastic member 720 may be disposed on the first outer side surface 221 of the first coupling unit 220. It may be parallel to the first outer side surface 221 of the first coupling unit 220. The first region 721 may comprise a hole 721-1. In the first region 721, the protrusion 229 of the first coupling unit 220 may be disposed in the hole 721-1. In the first region 721, the hole 721-1 may be formed at a position corresponding to the protrusion 229 of the first coupling unit 220. In the first region 721, the first coupling unit 220 and the protrusion 229 may penetrate through the hole 721-1 in the hole 721-1. The hole 721-1 of the first region 721 may be coupled to the protrusion 229 of the first coupling unit 220 in a one-touch clip method. The first region 721 may be disposed inside the protrusion 229 of the first coupling unit 220. That is, the protrusion 229 is protruded from the first region 721 to prevent the first elastic member 720 from being separated.

The second region 722 may be disposed on the second outer side surface 222 of the first coupling unit 220. The second region 722 of the second elastic member 720 may comprise two second regions 722-1 and 722-2 spaced apart from each other in an optical axis direction. A second portion 712 of the first elastic member 710 may be disposed between the two second regions 722-1 and 722-2. Each of the two second regions 722-1 and 722-2 may be disposed in the two fifth grooves 228-1 and 228-2 of the first coupling unit 220. The second region 722 may comprise: a portion parallel to the second outer side surface 222 of the first coupling unit 220; and a bent portion 723 being bent from a parallel portion and disposed in the fifth groove 228 of the second outer side surface 222 of the first coupling unit 220. The bent portion 723 may comprise a hook shape. The bent portion 723 may be bent toward the third region 724. The bent portion 723 may have a curvature at least in part. The bent portion 723 may be disposed to be caught in the fifth groove 228 of the first coupling unit 220. In the bent portion 723, the first coupling unit 220 may be hook-coupled to the fifth groove 228. The bent portion 723 may be formed at a position corresponding to the fifth groove 228 of the first coupling unit 220. The bent portion 723 may comprise a hook shape.

The third region 724 of the second elastic member 720 may be disposed between the first region 721 and the second region 722. The third region 724 may face the first elastic member 710. The third region 724 may be spaced apart from the first elastic member 710. The third region 724 may be in contact with the first column 410 of the first piezo motor 400. The third region 724 may press the first column 410 of the first piezo motor 400. The third region 724 may be formed to be flat. The third region 724 may be in contact with the first column 410 of the first piezo motor 400 at least in part. The inner surface facing the first coupling unit 220 of the third region 724 may comprise a bent shape at a portion being in contact with the first column 410. An inner surface of the third region 724 may have a curvature at least in part. The inner surface of the third region 724 may comprise a curved surface formed by being recessed from the inner surface at least in part. An outer surface being disposed at an opposite side of an inner surface of the third region 724 may comprise a flat surface. The camera module 10 according to the present embodiment may comprise a third elastic member 810.

The third elastic member 810 may fix the second piezo motor 500 to the second lens barrel 300. The third elastic member 810 may be disposed on the second outer side surface 322 of the second coupling unit 320. The third elastic member 810 may be spaced apart from the fourth elastic member 820. The third elastic member 810 may be spaced apart from the fourth elastic member 820 in a direction perpendicular to the optical axis direction.

The third elastic member 810 may comprise a first portion 811. The first portion 811 may be formed in a shape corresponding to the groove 324 of the second outer side surface 322 of the second coupling unit 320. The first portion 811 may be formed in a 'V' shape in cross section. The first portion 811 may comprise: a first inclined surface being formed inclinedly with respect to the second portion 812; and a second inclined surface being formed inclinedly with respect to the second portion 813. The first inclined surface and the second inclined surface may be formed integrally. The inclined direction of the first inclined surface may be different from the inclined direction of the second inclined surface. The inclined direction of the first inclined surface may be opposite to the inclined direction of the second inclined surface. The first inclined surface may be disposed between the first portion 811 and the second portion 812. The second inclined surface may be disposed between the first portion 811 and the third portion 813. The first portion 811 may have a first length in an optical axis direction.

The third elastic member 810 may comprise a second portion 812. The second portion 812 may be extended from one end of the first portion 811 in a direction perpendicular to the optical axis direction. The second portion 812 may be extended from the outer surface of the first portion 811 in a direction perpendicular to the optical axis direction. The length of the second portion 812 in an optical axis direction may be smaller than the length of the first portion 811 in an optical axis direction. The second portion 812 may be disposed between the two second regions 822-1 and 822-2 of the fourth elastic member 820. The second portion 812 may have a second length in an optical axis direction. The second length of the second portion 812 may be smaller than the second length of the first portion 811. The second portion 812 may be extended from the first portion 811. The second portion 812 may have the same length as that of the third portion 813 of the third elastic member 810, to be described later, in an optical axis direction. The second portion 812 and the third portion 813 may be formed symmetrically with respect to the first portion 811. The second portion 812 may be parallel to the third region 824 of the fourth elastic member 820.

The third elastic member 810 may comprise a third portion 813. The third portion 813 may be extended from the other end of the first portion 811 in a direction perpendicular to the optical axis direction. The third portion 813 may be extended from the outer surface of the first portion 811 in a direction perpendicular to the optical axis direction. The third portion 813 may have a second length in an optical axis direction. The second length of the third portion 813 in an optical axis direction may be smaller than the first length of the first portion 811 in an optical axis direction. A second length of the third portion 813 in an optical axis direction may be the same as the length of the second portion 812 in an optical axis direction. The third portion 813 may be overlapped with the second portion 812 in a direction perpendicular to the optical axis direction. The third portion 813 may be disposed in the hole 821-1 of the first region 821 of the fourth elastic member 820. The second portion 812 and the third portion 813 may not be in contact with the first column 410 of the second piezo motor 500. The third portion 813 may be parallel to the third region 824 of the fourth elastic member 820.

In a modified embodiment, the third elastic member 810 may further comprise an extension part. The extension part may be extended from the first portion 811 of the third elastic member 810. The extension part may be bent at a first angle with respect to the first portion 811 of the third elastic member 810. A surface of the extension part facing the second coupling unit 320 may form an acute angle with the first portion 811 of the third elastic member 810. A surface of the extension part facing the third elastic member 820 may form an obtuse angle with the first portion 811. The extension part may not come into contact with the second column 510 of the second piezo motor 500. Through this, insertion of the second column 510 may become easy. In addition, the second column 510 may be easily press-fitted between the third elastic member 810 and the fourth elastic member 820 having high elastic strength. The extension part may comprise: a first extension part being extended from the first inclined surface of the first portion 811; and a second extension part being extended from the second inclined surface of the first portion 811. The first extension part may be spaced apart from the second extension part at least in part. The separation distance between the first extension part and the second extension part may be increasing as it travels toward the upper side. The first extension part and the second extension part may not be in contact with the second column 510. The first extension part and the second extension part may guide the second column 510 when the second column 510 is assembled. The second elastic member 810 may be formed in a shape corresponding to the first elastic member 710.

The camera module 10 according to the present embodiment may comprise a fourth elastic member 820. The fourth elastic member 820 may be formed of an elastic material. The fourth elastic member 820 may be disposed to be caught in the groove 324 of the second outer side surface 322 of the second coupling unit 320. The fourth elastic member 820 may press the second piezo motor 500 in a direction toward the second lens barrel 300. Through this, the fourth elastic member 820 may fix the second piezo motor 500 to the second lens barrel 300. The fourth elastic member 820 is coupled with the fifth groove 328 of the second coupling unit 320 through a hook shape on one side, and may be coupled with the protrusion 329 of the second coupling unit 220 through the opening shape 821-1 of the other side.

The fourth elastic member 820 may comprise: a first region 821 being disposed on one side of the second coupling unit 320; a second region 822 being disposed on the other side of the second coupling unit 320, and a third region 824 connecting the first region 821 and the second region 822.

The first region 821 of the fourth elastic member 820 may be disposed on the first outer side surface 321 of the second coupling unit 320. The first region 821 of the fourth elastic member 820 may be parallel to the first outer side surface 221 of the second coupling unit 320. The first region 821 may comprise a hole 821-1. In the first region 821, the protrusion 329 of the second coupling unit 320 may be disposed in the hole 821-1. In the first region 821, the hole 821-1 may be formed at a position corresponding to the protrusion 329 of the second coupling unit 320. In the first region 821, in the hole 821-1, the second coupling unit 320 and the protrusion 329 may penetrate through the hole 821-1. The hole 821-1 of the first region 821 may be coupled to the protrusion 329 of the second coupling unit 320 in a one-touch clip method. The first region 821 may be disposed farther inside than the protrusion 329 of the second coupling unit 320. That is, the protrusion 329 is protruded more than the first region 821 to prevent the third elastic member 820 from being separated.

The second region 822 may be disposed on the second outer side surface 322 of the second coupling unit 320. The second region 822 of the fourth elastic member 820 may comprise two second regions 822-1 and 822-2 spaced apart from each other in an optical axis direction. A second portion 812 of the third elastic member 810 may be disposed between the two second regions 822-1 and 822-2. Each of the two second regions 822-1 and 822-2 may be disposed in the two fifth grooves 328-1 and 328-2 of the second coupling unit 320. The second region 822 may comprise: a portion parallel to the second outer side surface 322 of the second coupling unit 320; and a bent portion 823 being bent from a parallel portion and disposed in the fifth groove 328 of the second outer side surface 322 of the second coupling unit 320. The bent portion 823 may comprise a hook shape. The bent portion 823 may be disposed to be caught in the fifth groove 328 of the second coupling unit 320. In the bent portion 823, the second coupling unit 320 may be hook-coupled to the fifth groove 328. The bent portion 823 may be bent toward the third region 824. The bent portion 823 may have a curvature at least in part. The bent portion 823 may be formed at a position corresponding to the fifth groove 328 of the second coupling unit 320. The bent portion 823 may comprise a hook shape.

The third region 824 of the fourth elastic member 820 may be disposed between the first region 821 and the second region 822. The third region 824 may face the third elastic member 810. The third region 824 may be spaced apart from the third elastic member 810. The third region 824 may be in contact with the second column 510 of the second piezo motor 500. The third region 824 may press the second column 510 of the second piezo motor 500. The third region 824 may be formed to be flat. The third region 824 may be in contact with the second column 510 of the second piezo motor 500 at least in part. The inner surface facing the second coupling unit 320 of the third region 824 may comprise a bent shape at a portion being in contact with the second column 510. An inner surface of the third region 824 may have a curvature at least in part. The inner surface of the third region 824 may comprise a curved surface formed by being recessed from the inner surface at least in part. The outer surface disposed opposite to the inner surface of the third region 824 may comprise a flat surface.

The camera module 10 according to the present embodiment may comprise a printed circuit substrate 900. The printed circuit substrate 900 may be disposed under the housing 100. The printed circuit substrate 900 may be disposed below the lower plate unit 130 of the housing 100. The printed circuit substrate 900 may supply power or current to components disposed inside the housing 100. The printed circuit substrate 900 may comprise a flexible substrate. The substrate 800 may comprise a flexible printed circuit board (FPCB). An image sensor 910 may be disposed on the upper surface of the printed circuit substrate 900. An image sensor 910 may be disposed on the printed circuit substrate 900. The image sensor 910 may be disposed at a position corresponding to the first to fourth lenses 140, 240, 340, and 150.

Hereinafter, an optical device according to the present embodiment will be described.

The optical device may be any one among a hand phone, a portable phone, a smart phone, a portable smart device, a digital camera, a laptop computer, a digital broadcasting terminal, a personal digital assistant (PDA), a portable multimedia player (PMP), and navigation. However, the type of the optical device is not limited thereto, and any device for photographing a video or a picture may be comprised in the optical device.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A camera module comprising:
   a housing;
   a lens barrel disposed in the housing;
   a first elastic member and a second elastic member coupled with the lens barrel; and
   a piezo motor comprising a column disposed between the first elastic member and the second elastic member,
   wherein the first elastic member and second elastic member press the column of the piezo motor,
   wherein the lens barrel comprises a body unit and a coupling unit connected with the body unit, and
   wherein the coupling unit of the lens barrel comprises:
      a first groove coupled with one side of the second elastic member;
      a protrusion coupled with an other side of the second elastic member;
      a second groove into which one side of the first elastic member is inserted; and
      a third groove into which an other side of the first elastic member is inserted.

2. The camera module of claim 1, wherein the first elastic member comprises a first portion having a first length in an optical axis direction, a second portion and a third portion, and
   wherein each of the second and third portions extends from the first portion and has a second length smaller than the first length in the optical axis direction.

3. The camera module of claim 2, wherein the first portion of the first elastic member comprises a first inclined surface disposed between the first portion of the first elastic member and the second portion of the first elastic member, and a second inclined surface disposed between the first portion of the first elastic member and the third portion of the first elastic member, and
- wherein an inclined direction of the first inclined surface of the first elastic member is different from an inclined direction of the second inclined surface of the first elastic member.

4. The camera module of claim 3, wherein the first elastic member comprises an extension part bent at a first angle from the first portion, and
- wherein the extension part of the first elastic member does not contact the column of the piezo motor.

5. The camera module of claim 3, wherein the second elastic member comprises a first region disposed on a first side surface of the coupling unit of the lens barrel, a second region disposed on a second side surface of the coupling unit of the lens barrel, and a third region connecting the first region and the second region, and
- wherein the third region of the second elastic member is formed to be flat and at least a part of the third region contacts the column of the piezo motor.

6. The camera module of claim 5, wherein the second region of the second elastic member comprises a bent portion bent toward the third region of the second elastic member.

7. The camera module of claim 6, wherein the second side surface of the coupling unit of the lens barrel comprises a fourth groove, and
- wherein the bent portion of the second region of the second elastic member is disposed to be caught by the fourth groove of the coupling unit of the lens barrel.

8. The camera module of claim 5, wherein the first region of the second elastic member comprises a hole, and
- wherein the hole of the second elastic member is coupled with the protrusion of the coupling unit of the lens barrel.

9. The camera module of claim 5, wherein the second region of the second elastic member comprises two second regions spaced apart from each other in the optical axis direction, and
- wherein the second portion of the first elastic member is disposed between the two second regions of the second elastic member.

10. The camera module of claim 9, wherein the second portion and the third portion of the first elastic member are parallel to the third region of the second elastic member.

11. The camera module of claim 1, wherein the housing comprises an upper plate unit and a side plate unit extending from the upper plate unit,
- wherein the lens barrel comprises a first lens barrel disposed below the upper plate unit of the housing, and a second lens barrel disposed below the first lens barrel,
- wherein a first lens is coupled with the upper plate unit of the housing, a second lens is coupled with the first lens barrel, and a third lens is coupled with the second lens barrel, and
- wherein the second lens and the third lens are individually movable.

12. The camera module of claim 11, wherein the second lens and the third lens are configured to move in an optical axis direction, and
- wherein a moving distance of the second lens is different from a moving distance of the third lens.

13. The camera module of claim 11, comprising a fourth lens fixed to the housing,
- wherein the second lens and the third lens are disposed between the first lens and the fourth lens.

14. The camera module of claim 1, wherein the second elastic member comprises a curved inner surface facing the column,
- wherein the second elastic member is configured to press the column toward the first elastic member at the curved surface, and
- wherein an outer surface of the second elastic member opposite the curved inner surface is flat.

15. An optical device comprising:
a main body;
the camera module of claim 1 disposed on the main body; and
a display disposed on the main body and configured to output an image being photographed by the camera module.

16. A camera module comprising:
a housing;
a lens barrel disposed in the housing;
a first elastic member and a second elastic member coupled with the lens barrel; and
a piezo motor comprising a column disposed between the first elastic member and the second elastic member,
wherein the piezo motor is configured to move the lens barrel in an optical axis direction,
wherein the second elastic member is configured to press the column toward the first elastic member,
wherein the lens barrel comprises a body unit and a coupling unit connected with the body unit,
wherein the coupling unit of the lens barrel comprises a groove coupled with one side of the second elastic member and a protrusion coupled with an other side of the second elastic member,
wherein the first elastic member comprises a first portion having a first length in an optical axis direction, a second portion and a third portion, and
wherein each of the second and third portions extends from the first portion and has a second length smaller than the first length in the optical axis direction.

17. The camera module of claim 16, wherein the second elastic member has a hook coupled with the lens barrel.

18. The camera module of claim 16, comprising a pin disposed in the optical axis direction,
wherein the lens barrel is configured to slide along the pin.

19. The camera module of claim 16, comprising:
a magnet scale disposed on the lens barrel; and
a magnetoresistor sensor configured to sense the magnet scale.

20. A camera module comprising:
a housing;
a lens barrel disposed in the housing;
a first elastic member and a second elastic member coupled with the lens barrel; and
a piezo motor comprising a column disposed between the first elastic member and the second elastic member,
wherein the first elastic member and second elastic member press the column of the piezo motor,
wherein the lens barrel comprises a body unit and a coupling unit connected with the body unit,
wherein a first end of the second elastic member comprises a hook is coupled with a groove of the coupling unit, and a second end of the second elastic member comprises an opening is coupled with a protrusion of the coupling unit,
wherein the housing comprises an upper plate unit and a side plate unit extending from the upper plate unit, wherein the lens barrel comprises a first lens barrel disposed below the upper plate unit of the housing and a second lens barrel disposed below the first lens barrel, wherein a first lens is coupled with the upper plate unit of the housing, a second lens is coupled with the first lens barrel, and a third lens is coupled with the second lens barrel, and wherein the second lens and the third lens are individually movable.

\* \* \* \* \*